United States Patent
Yasuhara

(10) Patent No.: US 8,298,164 B2
(45) Date of Patent: Oct. 30, 2012

(54) MOTION ASSISTING DEVICE

(75) Inventor: Ken Yasuhara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 730 days.

(21) Appl. No.: 12/519,251

(22) PCT Filed: Aug. 19, 2008

(86) PCT No.: PCT/JP2008/002236
§ 371 (c)(1),
(2), (4) Date: Jun. 15, 2009

(87) PCT Pub. No.: WO2009/050839
PCT Pub. Date: Apr. 23, 2009

(65) Prior Publication Data
US 2010/0049102 A1 Feb. 25, 2010

(30) Foreign Application Priority Data
Oct. 19, 2007 (JP) ................. 2007-272018

(51) Int. Cl.
*A61H 1/00* (2006.01)
*A61F 5/00* (2006.01)
*A47D 13/04* (2006.01)

(52) U.S. Cl. .............. 601/5; 601/35; 602/23; 482/66

(58) Field of Classification Search .......... 601/5, 33–35; 602/5, 23–25, 16, 18, 19; 623/25, 30; 331/65; 600/595; 607/48–49; 482/66, 128
See application file for complete search history.

(56) References Cited

U.S. PATENT DOCUMENTS

| 2004/0158175 A1* | 8/2004 | Ikeuchi et al. ............... 601/5 |
| 2004/0167641 A1 | 8/2004 | Kawai et al. |

FOREIGN PATENT DOCUMENTS

| EP | 1410780 A1 | 4/2004 |
| EP | 1547567 A1 | 6/2005 |
| EP | 1661543 A1 | 5/2006 |
| JP | 2004-073649 | 3/2004 |
| JP | 2004-329520 | 11/2004 |
| JP | 2007-061217 | 3/2007 |

\* cited by examiner

*Primary Examiner* — Patricia Bianco
*Assistant Examiner* — Ophelia Hawthorne
(74) *Attorney, Agent, or Firm* — Rankin, Hill & Clark LLP

(57) ABSTRACT

Provided is a motion assisting device capable of assisting a periodical walking motion of a creature so as to conduct a smooth motion of a leg thereof. According to the motion assisting device, an assisting force applied to the creature so as to assist a leg of the creature in moving with respect to a body thereof is reinforced by an increment in an auxiliary coefficient increased in a reinforcement duration. Accordingly, the stretch motion of the leg at the on-ground state is assisted by a relatively stronger assisting force. Thereby, the body is conducted to translate forward by a floor reaction force subjected to the leg at the on-ground state. A flexion motion of the leg at an off-ground state is induced by a reflex (stretch reflex) to the stretch motion of the leg by the assisting force at a previous off-ground state.

13 Claims, 10 Drawing Sheets

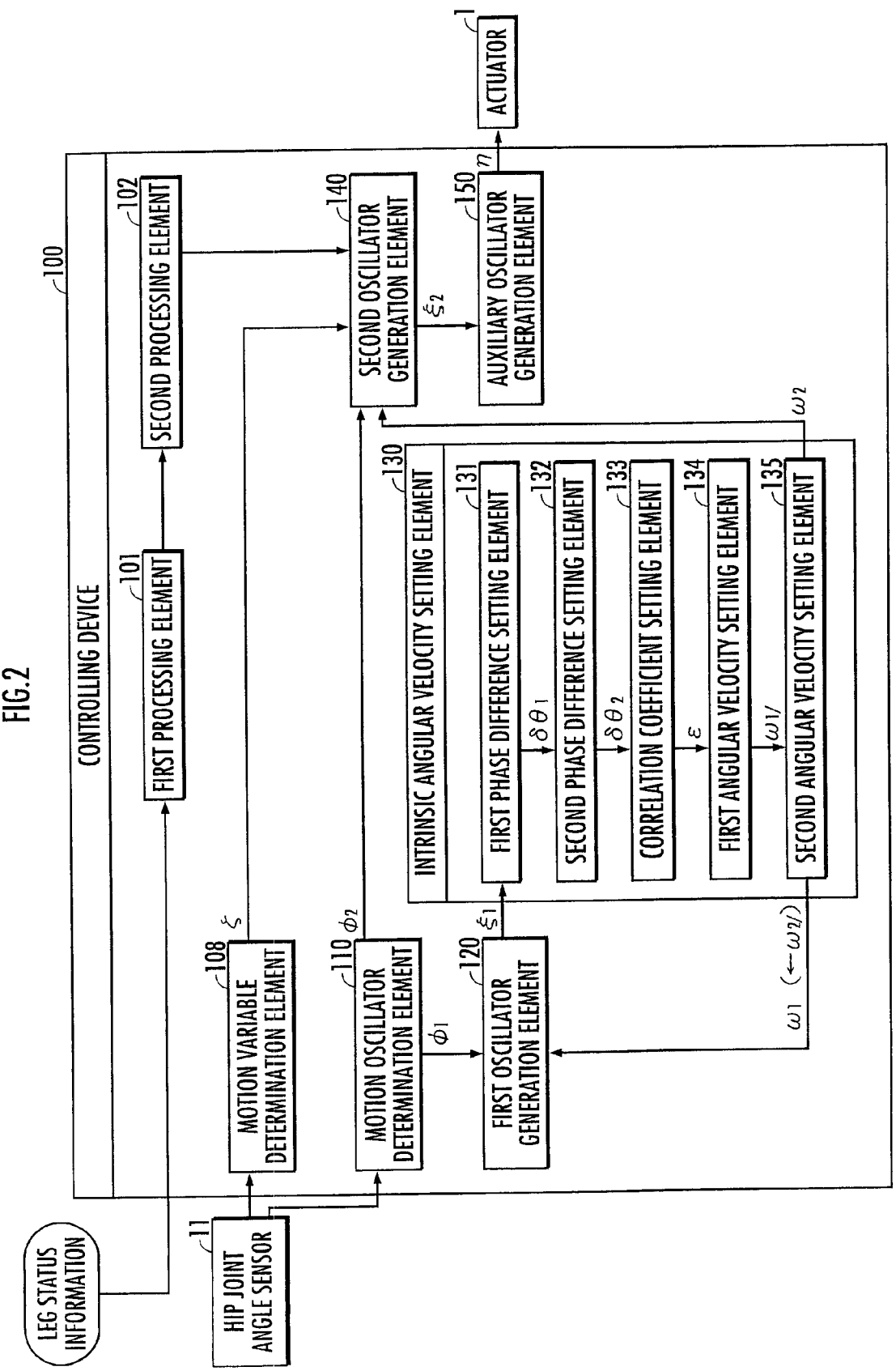

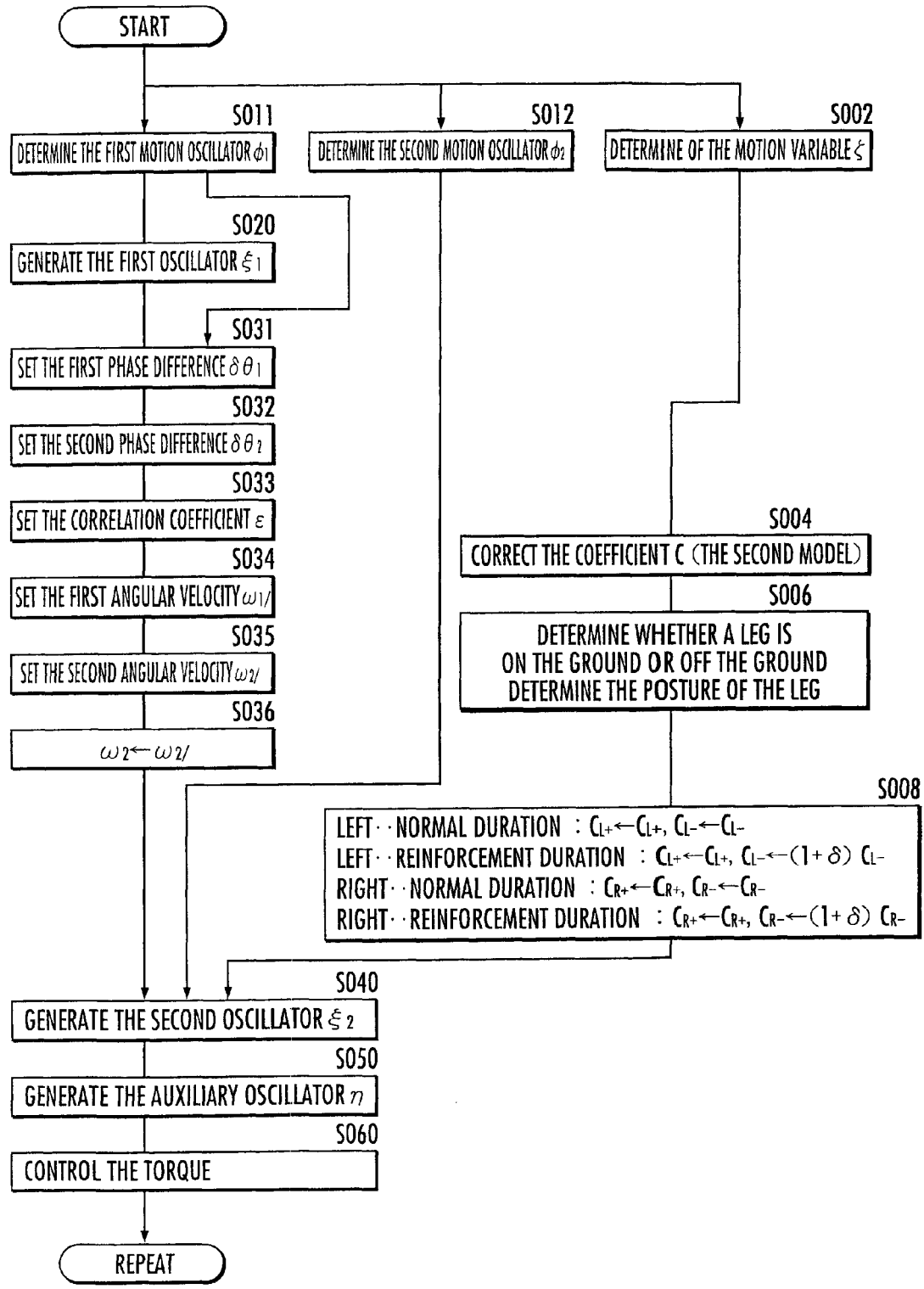

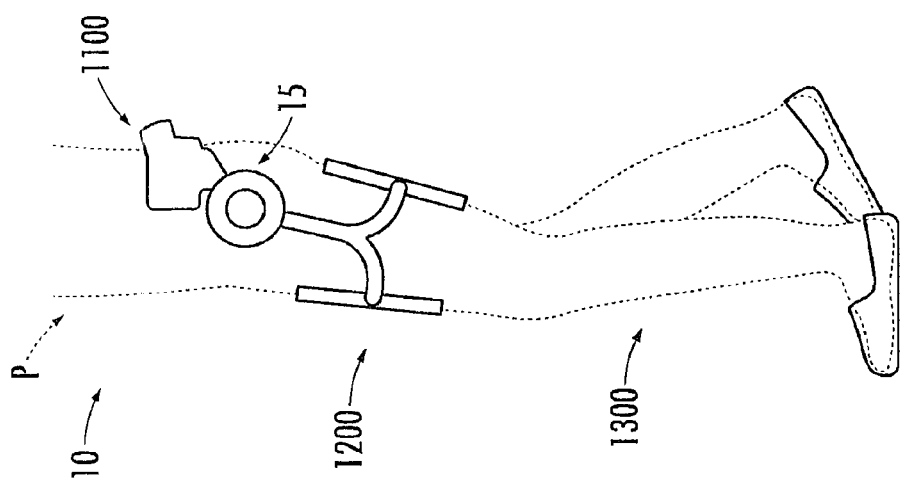
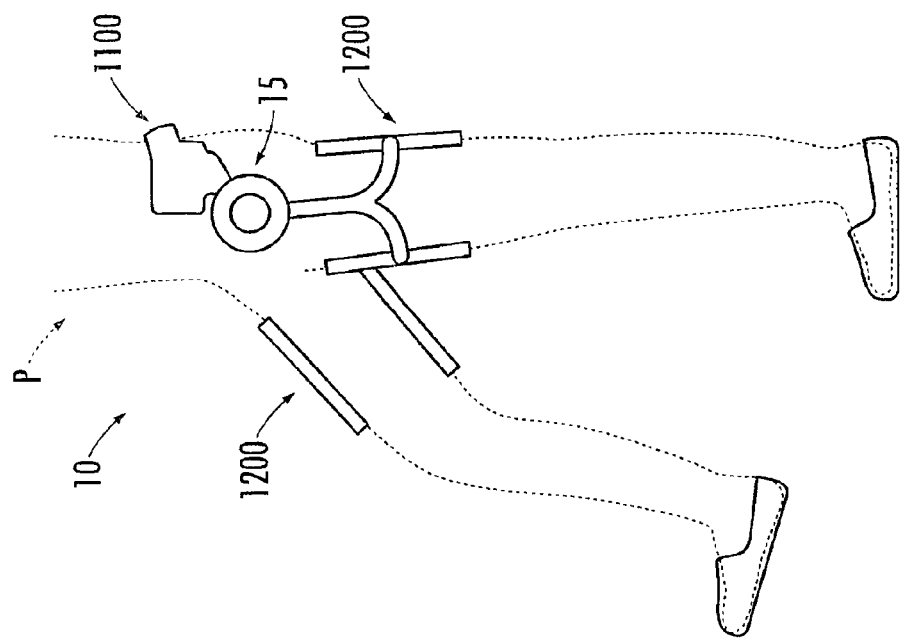

MOTION ASSISTING DEVICE

BACKGROUND OF THE INVENTION

1. Field of the Invention

The present invention relates to a motion assisting device for assisting a walking motion of a creature by applying to the creature an assisting force which assists a leg in moving with respect to a body.

2. Description of the Related Art

According to a first prior art (refer to Japanese Patent Laid-open No. 2004-073649), a periodical walking motion of a creature, such as a human whose body such as a lower limb or the like is suffering from hypofunction, is assisted by applying a periodically varying force to the creature. According to a second prior art (refer to Japanese Patent Laid-open No. 2007-061217), a periodical motion of a human can be assisted by adjusting a force applied to the human according to a second model (spring model) representing a behavior feature of a virtual elastic element so as to match a motion scale of the human to a desired motion scale thereof. According to the first and the second prior arts, the periodical motion of a creature can be assisted so as to match a motion rhythm of the creature to a desired motion rhythm thereof. Particularly, according to the second prior art adopting the spring model, the periodical motion of the creature can be assisted so as to match the motion scale of the creature to the desired motion scale thereof.

However, the first prior art and the second prior art can be further modified from the viewpoint of conducting a smooth motion of a plurality of legs of the creature.

SUMMARY OF THE INVENTION

The present invention has been accomplished in view of the aforementioned problems, and it is therefore an object of the present invention to provide a motion assisting device capable of assisting a periodical walking motion of a creature so as to conduct a smooth motion of a plurality of legs thereof.

A first aspect of the present invention provides a motion assisting device which assists a walking motion of a creature by applying to the creature an assisting force which assists a leg in moving with respect to a body comprises: a controlling device configured to control the assisting force according to an auxiliary coefficient, wherein the controlling device includes a first processing element configured to determine whether the leg is at an on-ground state or at an off-ground state, and a posture of the leg with respect to the body; and a second processing element configured to adjust the auxiliary coefficient so as to make the auxiliary coefficient in a reinforcement duration containing a part or a total of a second duration in which the leg is performing a stretch motion at an on-ground state as a second reinforcement duration greater than the auxiliary coefficient in a duration other than the reinforcement duration, on the basis of a determination result by the first processing element.

According to the motion assisting device of the first aspect of the present invention, the assisting force applied to the creature is reinforced only by an increment in the auxiliary coefficient increased in the reinforcement duration containing the second reinforcement duration. Note that it is not limited that the reinforced assisting force is stronger than the assisting force in the duration other than the reinforcement duration. The second reinforcement duration is referred to as a part or a total of the second duration in which the leg is performing a stretch motion (backward motion) at the on-ground state. Accordingly, the stretch motion of the leg at the on-ground state is assisted by a relatively stronger assisting force, and resultantly, the leg is subjected to a relatively stronger floor reaction force. The floor reaction force is transmitted to the body through the leg at the on-ground state to conduct the body to translate forward. When the leg is stretched by the assisting force at the on-ground state, there occurs a reflex (stretch reflex) to the stretch motion of the leg. As a result, the flexion motion (forward motion) of the leg at a subsequent off-ground state is induced by the stretch reflex at the previous on-ground state. According thereto, the periodical walking motion of the creature can be assisted to conduct not only a stretch motion (backward motion) of the leg of the creature at the on-ground state, but also a smooth flexion motion (forward motion) thereof at the off-ground state.

A second aspect of the motion assisting device of the present invention is dependent on the first aspect of the present invention, wherein the second processing element is configured to adjust the auxiliary coefficient so as to make the auxiliary coefficient in the reinforcement duration further containing a part or a total of a first duration in which the leg is moved from the flexion motion at the off-ground state to the stretch motion to step on the ground as a first reinforcement duration greater than the auxiliary coefficient in the duration other than the reinforcement duration.

According to the motion assisting device of the second aspect of the present invention, the assisting force applied to the creature is controlled to be stronger in the reinforcement duration containing the first reinforcement duration and the second reinforcement duration than that in the duration other than the reinforcement duration. The first reinforcement duration is referred to as a part or a total of the first duration in which the leg is moved from the flexion motion at the off-ground state to the stretch motion to step on the ground. Accordingly, the stretch motion of the leg immediately before the leg steps on the ground is assisted by a relatively stronger assisting force. When the leg is landed on the ground, it is subjected to a relatively stronger floor reaction force. As above mentioned, the floor reaction force is transmitted to the body through the leg at the on-ground state to conduct the body to translate forward and the leg to perform the flexion motion at the off-ground state. According thereto, the periodical walking motion of the creature can be assisted to conduct not only a stretch motion (backward motion) of the leg of the creature at the on-ground state, but also a smooth flexion motion (forward motion) thereof at the off-ground state.

A third aspect of the motion assisting device of the present invention is dependent on the first aspect of the present invention, wherein the controlling device includes a motion oscillator determination element configured to determine a second motion oscillator which periodically varies according to the walking motion of the creature; and a second oscillator generation element configured to generate a second oscillator as an output oscillation signal from a second model by inputting the second motion oscillator determined by the motion oscillator determination element to the second model as an input oscillation signal, in which the second model is configured to generate an output oscillation signal which periodically varies at an angular velocity defined according to a second intrinsic angular velocity on the basis of an input oscillation signal; and the controlling device controls the assisting force so that the assisting force periodically varies according to an amplitude determined according to the auxiliary coefficient and an angular velocity of the second oscillator generated by the second oscillator generation element.

According to the motion assisting device of the third aspect of the present invention, the periodical walking motion of the creature can be assisted to conduct not only a stretch motion (backward motion) of the leg of the creature at the on-ground state, but also a smooth flexion motion (forward motion) thereof at the off-ground state. Furthermore, the periodical operation of the motion assisting device can be controlled so as to maintain stable an amplitude relationship and a phase relationship between the periodical walking motion of the creature and the periodical operation of the motion assisting device.

A fourth aspect of the motion assisting device of the present invention is dependent on the third aspect of the present invention, wherein the controlling device includes a motion variable determination element configured to determine a motion variable representing a scale of the walking motion performed by the creature; the second model is defined by a simultaneous differential equation having a plurality of state variables representing a behavior state of the creature; and the second oscillator generation element corrects the second model by correcting a constant or a coefficient contained in the simultaneous differential equation so as to approximate a determination value of the motion variable obtained from the motion variable determination element to a desired value and generates the second oscillator on the basis of the state variables obtained by solving the simultaneous differential equation.

According to the motion assisting device of the fourth aspect of the present invention, the periodical walking motion of the creature can be assisted to conduct not only a stretch motion (backward motion) of the leg of the creature at the on-ground state, but also a smooth flexion motion (forward motion) thereof at the off-ground state. Furthermore, the periodical walking motion can be assisted so as to approximate the motion variable representing the scale of the walking motion performed by the creature to a desired value.

A fifth aspect of the motion assisting device of the present invention is dependent on the third aspect of the present invention and further includes an adjusting device, wherein the second model is defined by a simultaneous differential equation having a plurality of state variables representing a behavior state of the creature; the adjusting device is capable of manually adjusting a constant or a coefficient in the simultaneous differential equation; and the second oscillator generation element generates the second oscillator on the basis of the state variables obtained by solving the simultaneous differential equation.

According to the motion assisting device of the fifth aspect of the present invention, the periodical walking motion of the creature can be assisted to conduct not only a stretch motion (backward motion) of the leg of the creature at the on-ground state, but also a smooth flexion motion (forward motion) thereof at the off-ground state. Furthermore, the operation mode of the motion assisting device can be manually adjusted through the adjusting device so as to maintain stable an amplitude relationship and a phase relationship between the periodical walking motion of the creature and the periodical operation of the motion assisting device.

A sixth aspect of the motion assisting device of the present invention is dependent on the fourth aspect of the present invention, wherein the constant or the coefficient in the simultaneous differential equation adjusted by the second processing element serves as the auxiliary coefficient.

According to the motion assisting device of the sixth aspect of the present invention, the periodical walking motion of the creature can be assisted to conduct not only a stretch motion (backward motion) of the leg of the creature at the on-ground state, but also a smooth flexion motion (forward motion) thereof at the off-ground state. Furthermore, by adjusting the auxiliary coefficient for defining the assisting force applied to the creature, the motion variable representing the scale of the periodical walking motion of the creature can be made to approximate to the desired value, or the operation mode of the motion assisting device can be manually adjusted through the adjusting device to maintain stable an amplitude relationship and a phase relationship between the periodical walking motion of the creature and the periodical operation of the motion assisting device.

A seventh aspect of the motion assisting device of the present invention is dependent on the third aspect of the present invention, wherein the controlling device includes a motion variable determination element configured to determine a motion variable representing a scale of the walking motion performed by the creature; and the controlling device controls the assisting force so that the assisting force periodically varies according to an amplitude determined according to an elastic coefficient of a virtual elastic element serving as the auxiliary coefficient and an angular velocity of the second oscillator generated by the second oscillator generation element, both of which are used to approximate a determination value of the motion variable obtained from the motion variable determination element to a desired value.

According to the motion assisting device of the seventh aspect of the present invention, the periodical walking motion of the creature can be assisted to conduct not only a stretch motion (backward motion) of the leg of the creature at the on-ground state, but also a smooth flexion motion (forward motion) thereof at the off-ground state. Furthermore, the periodical walking motion can be assisted so as to approximate the motion variable representing the scale of the walking motion performed by the creature to the desired value.

An eighth aspect of the motion assisting device of the present invention is dependent on the third aspect of the present invention, wherein the motion oscillator determination element determines a first motion oscillator which periodically varies according to the walking motion of the creature; the controlling device includes a first oscillator generation element and an intrinsic angular velocity setting element, in which the first motion oscillator generation element is configured to generate a first oscillator as an output oscillation signal from a first model by inputting the first motion oscillator determined by the motion oscillator determination element to the first model as an input oscillation signal, in which the first model is configured to generate an output oscillation signal which varies at an angular velocity defined according to a first intrinsic angular velocity by entraining to an input oscillation signal; and the intrinsic angular velocity setting element is configured to set an angular velocity of a second virtual oscillator as the second intrinsic angular velocity according to a virtual model on the basis of a first phase difference between the first motion oscillator determined by the motion oscillator determination element and the first oscillator generated by the first oscillator generation element so as to approximate a second phase difference to a desired phase difference, in which the virtual model is expressed by a first virtual oscillator and the second virtual oscillator which vary periodically with the second phase difference while interacting mutually.

According to the motion assisting device of the eighth aspect of the present invention, the periodical walking motion of the creature can be assisted to conduct not only a stretch motion (backward motion) of the leg of the creature at the on-ground state, but also a smooth flexion motion (forward motion) thereof at the off-ground state. Furthermore, the periodical operation of the motion assisting device can be controlled so as to approximate the phase relationship between the periodical walking motion of the creature and the periodical operation of the motion assisting device to the desired phase relationship expressed by the desired phase difference.

BRIEF DESCRIPTION OF THE DRAWINGS

FIG. 2 is an explanatory diagram schematically illustrating a controlling device of the motion assisting device according to the first embodiment;

FIG. 3 is a flow chart illustrating a motion assist method according to the first embodiment;

FIG. 4 is an explanatory diagram illustrating an operation of the motion assisting device;

DETAILED DESCRIPTION OF THE PREFERRED EMBODIMENTS

An embodiment of a motion assisting device according to the present invention will be described with reference to the drawings. Hereinafter, symbols "L" and "R" are used to differentiate a left leg and a right leg or the like. However, the symbols may be omitted if there is not necessary to differentiate a left part and a right part or a vector having both of left and right components is mentioned. Moreover, symbols "+" and "−" are used to differentiate a flexion motion (forward motion) and a stretch motion (backward motion) of the leg (in particular, a thigh).

Figure 1:
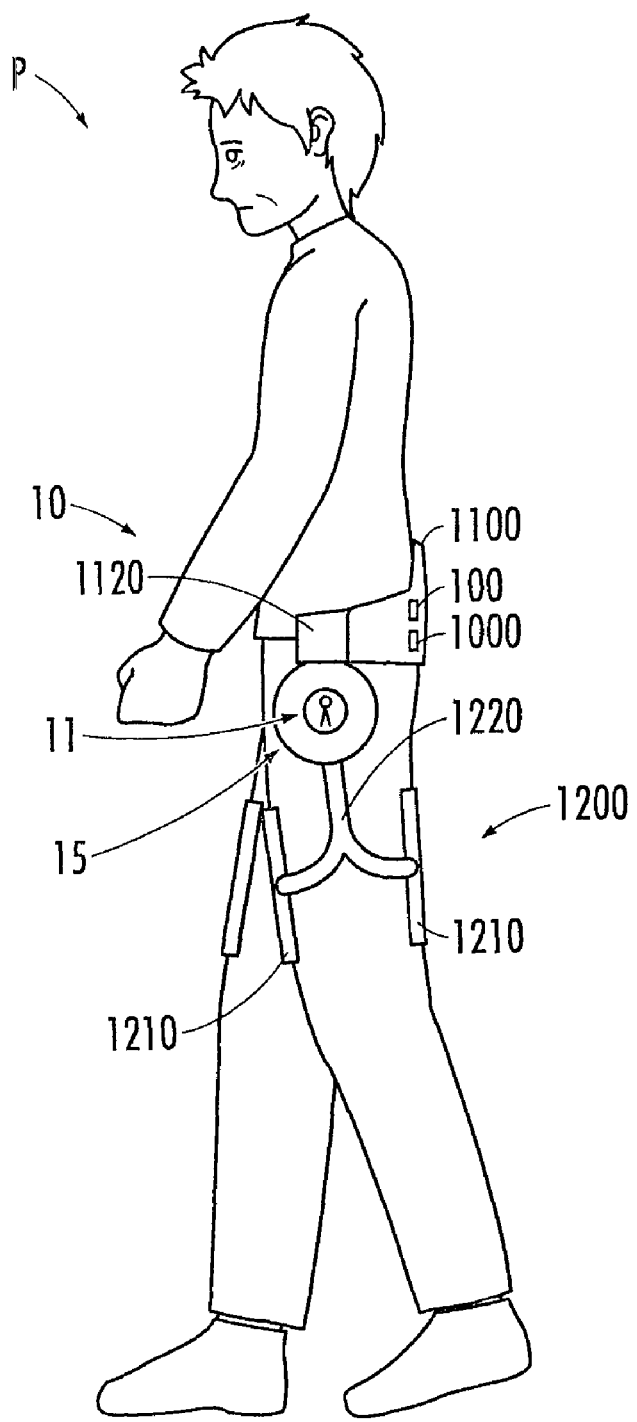
FIG. 1 is an explanatory diagram schematically illustrating a motion assisting device according to a first embodiment of the present invention.

First, descriptions will be performed on a first embodiment of the present invention. FIG. 1 illustrates a motion assisting device 10 which assists a human P in walking motion according to the first embodiment of the present invention. The motion assisting device 10 includes a first orthosis 1100 attached to a waist (a first body part) of the human P, a second orthosis 1200 attached to a thigh (a second body part) of the human P, a hip joint angle sensor 11, an actuator 15, a controlling device 100, and a battery 1000.

The first orthosis 1100 includes a first supporter 1110 and a first link member 1120. The first supporter 1110 is made from a combination of a rigid material such as a rigid resin and a flexible material such as a fiber and is mounted on the waist backward. The first link member 1120 is made of a rigid resin, and is fixed at the first supporter 1110 in such a way that when the first supporter 1110 is attached to the waist, the first link member 1120 is located at both sides of the waist laterally. The second orthosis 1200 includes a second supporter 1210 and a second link member 1220. Similar to the first supporter 1110, the second supporter 1210 is also made from a combination of a rigid material and a flexible material and is mounted on a front side and a back side of the thigh, respectively. The second link member 1220 is made of a rigid resin, extending vertically along outside of the thigh and formed as being forked into two downwardly and is connected to an output shaft of the actuator 15 and the second supporter 1210. Note that it is acceptable to mount a third orthosis to the human P. The third orthosis is comprised of a third supporter and a third link member. The third supporter is formed to have a shape of a slipper or a shoe which is mounted to a foot of the human P. The third link member is configured to extend vertically along the crus so as to connect the third supporter and a lower end portion of the second link member 1220 in a movable manner.

The hip joint angle sensor 11 is comprised of a rotary encoder disposed on a transverse side of the waist of the human P and outputs a signal according to the hip joint angle. The actuator 15 is comprised of a motor, including either one or both of a reduction gear and a compliance mechanism where appropriate. The battery 1000 is housed in the first orthosis 1100 (for example, fixed in multiple sheets of cloth constituting the first supporter 1110), which supplies electrical power to the actuator 15, the controlling device 100 and the like. Note that it is acceptable to attach or house the controlling device 100 and the battery 1000 in the second orthosis 1200; it is also acceptable to dispose them separately from the motion assisting device 10.

The controlling device 100 includes a computer housed in the first orthosis 1100 and a software stored in a memory or a storing device in the computer. The controlling device 100 controls an operation or an output torque T of the actuator 15 by adjusting the electrical power supplied from the battery 1000 to the actuator 15. The magnitude of an output from the actuator 15 is controlled according to the value of an auxiliary coefficient which will be described hereinafter. The controlling device 100 illustrated in FIG. 2 is provided with a first processing element 101, a second processing element 102, a motion variable determination element 108, a motion oscillator determination element 110, a first oscillator generation element 120, an intrinsic angular velocity setting element 130, a second oscillator generation element 140, and an auxiliary oscillator generation element 150. Each element may be constituted from a mutually different CPU, or a universal CPU or the like.

The first processing element 101 determines whether each leg of the human P is on the ground or has been raised from the ground and a posture of each with respect to the body. The second processing element 102 adjusts the auxiliary coefficient so as to make the auxiliary coefficient in a reinforcement duration greater than the auxiliary coefficient in a duration other than the reinforcement duration on the basis of the determination result by the first processing element 101.

The motion variable determination element 108 determines the value of a motion variable $\zeta$ which represents a scale of a periodical motion of the human P. The motion oscillator determination element 110 determines an angular velocity of each hip joint as a first motion oscillator $\phi_1$ and an angle thereof as a second motion oscillator $\phi_2$ on the basis of an output from the hip joint angle sensor 11. Each of the first motion oscillator $\phi_1$ and the second motion oscillator $\phi_2$ varies periodically according to the periodical motion of the human P, and a variation pattern thereof is defined by an amplitude and a phase (or an angular velocity which is a first order differentiation of the phase by time). Determination of an oscillator means to determine a periodical variation pattern of the oscillator. The first oscillator generation element 120 generates a first oscillator $\xi_1$ as an output oscillation signal from a first model by inputting the first motion oscillator $\phi_1$ determined by the motion oscillator determination element 110 as an input oscillation signal to the first model. Generation of an oscillator means to define a periodical variation pattern for the oscillator. The "first model" is a model configured to generate an output oscillation signal which varies at an angular velocity defined according to a first intrinsic angular velocity $\omega_1$ by entraining to an input oscillation signal.

The intrinsic angular velocity setting element 130 includes a first phase difference setting element 131, a second phase difference setting element 132, a correlation coefficient setting element 133, a first angular velocity setting element 134, and a second angular velocity setting element 135. The intrinsic angular velocity setting element 130 sets a second intrinsic angular velocity $\omega_2$ so as to approximate a second phase difference $\delta\theta_2$ to a desired phase difference $\delta\theta_0$ according to a virtual model on the basis of a first phase difference $\delta\theta_1$. The first phase difference $\delta\theta_1$ is a phase difference between the first motion oscillator $\phi_1$ determined by the motion oscillator determination element 110 and the first oscillator $\xi_1$ generated by the first oscillator generation element 120. The virtual model represents a periodical motion of the human P with a periodical variation of a first virtual oscillator $\phi_1$, a periodical operation of the motion assisting device 10 with a periodical variation of a second virtual oscillator $\phi_2$, and a phase difference between the periodical motion of the human P and the periodical operation of the motion assisting device 10 with a phase difference between the first virtual oscillator $\phi_1$ and the second virtual oscillator $\phi_2$, namely, the second phase difference $\delta\theta_2$, respectively.

The second oscillator generation element 140 generates a second oscillator $\xi_2$ as an output oscillation signal from a second model by inputting the second motion oscillator $\phi_2$ determined by the motion oscillator determination element 110 as an input oscillation signal to the second model. The "second model" is a model which generates an output oscillation signal varying at an angular velocity defined according to the second intrinsic angular velocity $\omega_2$ defined by the intrinsic angular velocity setting element 130 on the basis of an input oscillation signal.

The auxiliary oscillator generation element 150, on the basis of the second oscillator $\xi_2$ generated by the second oscillator generation element 140, generates an auxiliary oscillator $\eta$. The auxiliary oscillator $\eta$ is used to define a variation pattern of the torque applied to the thigh by the actuator 15 in the motion assisting device 10.

Hereinafter, the operation of the motion assisting device 10 having the configuration mentioned in the first embodiment of the present invention will be described. The motion variable determination element 108, on the basis of the output signal from the hip joint angle sensor 11, determines the left hip joint angle and the right hip joint angle at the respective finished timing of the flexion motion and the finished timing of the stretch motion of the thigh for each walking cycle (FIG. 3/S002) (in detail, the left hip joint angle at the finished timing of the flexion motion, the left hip joint angle at the finished timing of the stretch motion, the right hip joint angle at the finished timing of the flexion motion and the right hip joint angle at the finished timing of the stretch motion of the thigh) as the motion variable $\zeta=\{\zeta_i|i=L+, L-, R+, R-\}$. Note that it is acceptable to determine a footstep of the human P as the motion variable $\zeta$. The footstep, for example, may be determined on the basis of a correlation among the hip joint angle of the human P which is determined according to the output signal from the hip joint angle sensor 11, the hip joint angle of the human P stored in memory and the foot position in the anteroposterior direction. Herein, it is possible to determine a step rate (numbers of steps every unit time) and a walking velocity of the human P, and thereafter determine the footstep on the basis of the step rate and the walking velocity. The step rate may be determined on the basis of an output signal from an acceleration sensor attached to the human P, which outputs the output signal according to an acceleration of the human P in the vertical direction. The walking velocity may be determined on the basis of an output signal from a velocity sensor disposed in a treadmill 30, which outputs the output signal according to the speed of an endless belt 32. Moreover, it is also acceptable to determine the value of a function, namely the motion variable $\zeta$, having multiple variables containing at least one of the walking rate (=footstep/step rate), the footstep, the left hip joint angle at the finished timing of the flexion motion and the left hip joint angle at the finished timing of the stretch motion, the right hip joint angle at the finished timing of the flexion motion and the right hip joint angle at the finished timing of the stretch motion of the thigh for each walking cycle.

Further, the motion oscillator determination element 110 determines the angular velocity of each of the left and right hip joints of the human P as the first motion oscillator $\phi_1=(\phi_{1L}, \phi_{1R})$ on the basis of the output from the hip joint angle sensor 11 (FIG. 3/S011). Furthermore, the motion oscillator determination element 110 determines the left hip joint angle and the right joint angle of the human P as the second motion oscillator $\phi_2=(\phi_{2L}, \phi_{2R})$ on the basis of the output from the hip joint angle sensor 11 (FIG. 3/S012).

Note that it is acceptable to determine an arbitrary variable varying periodically according to the periodical motion of the human P by using an appropriate sensor as the first motion oscillator $\phi_1$ and the second motion oscillator $\phi_2$, respectively. For example, an angle or angular velocity of an arbitrary joint, such as the hip joint, knee joint, ankle joint, shoulder joint, elbow joint and the like, and a position of the thigh, foot, upper arm and waist (the position or the like in the anteroposterior direction or the vertical direction with the center-of-gravity of the human P as a reference), and a variation pattern of velocity or acceleration may be determined as the motion oscillator. The variation patterns of various parameters varying at a rhythm in conjunction with the walking motion rhythm, such as a sound generated when the left or right leg steps on the ground, a breathing sound, a deliberate phonation or the like, may be determined as one or both of the first motion oscillator $\phi_1$ and the second motion oscillator $\phi_2$. Moreover, it is acceptable to determine variables representing the periodical motion state of the same body part, such as the angle and the angular velocity or the like of the same joint, as the first motion oscillator $\phi_1$ and the second motion oscillator $\phi_2$, respectively; it is also acceptable to determine variables representing the periodical motion state of different body parts, such as the respective angles and the angular velocities or the like of different joints, as the first motion oscillator $\phi_1$ and the second motion oscillator $\phi_2$, respectively.

Thereafter, the first oscillator generation element 120 generates the first oscillator $\xi_1$ as an output oscillation signal from the first model by inputting the first motion oscillator $\phi_1$ determined by the motion oscillator determination element 110 as an input oscillation signal to the first model (FIG. 3/S020). The first model represents the correlation between a plurality of first elements, such as the left and right feet or the like, and generates the output oscillation signal which varies at the angular velocity defined according to the first intrinsic angular velocity $\omega_1=(\omega_{1L}, \omega_{1R})$ by entraining to the input oscillation signal as described above. The first model, for example, may be defined by the Van der Pol equation expressed by the equation (10). Moreover, it is possible that the first oscillator generation element 120 sequentially updates the first model by adopting an updated second intrinsic angular velocity $\omega_2$ set by the intrinsic angular velocity setting element 130 as an updated first intrinsic angular velocity $\omega_1$, and generates a subsequent first oscillator $\xi_1$ as the output oscillation signal by inputting a subsequent first motion oscillator $\phi_1$ as the input oscillation signal into the updated first model.

$$(d^2\phi_{1L}/dt^2)=A(1-\xi_{1L}^2)(d\xi_{1L}/dt)-\omega_{1L}^2\xi_{1L}+g(\xi_{1L}-\xi_{1R})+K_1\phi_{1L},$$

$$(d^2\phi_{1R}/dt^2)=A(1-\xi_{1R}^2)(d\xi_{1R}/dt)-\omega_{1R}^2\xi_{1R}+g(\xi_{1R}-\xi_{1L})+K_1\phi_{1R} \quad (10)$$

Wherein:

A: a positive coefficient set in such a way that a stable limit cycle may be drawn from the first oscillator $\xi_1$ and the first order temporal differential $(d\xi_1/dt)$ thereof in a plane of "$\xi_1-(d\xi_1/dt)$";

g: a first correlation coefficient for reflecting the correlation of different body parts, such as the left and right feet of the human P or the like, with the correlation of each of the left and right components of the first oscillator $\xi_1$ (correlation of the output oscillation signals among the plurality of first elements); and $K_1$: a feedback coefficient with respect to the first motion oscillator $\phi_1$.

The first oscillator $\xi_1=(\xi_{1L}, \xi_{1R})$ is calculated or generated according to the Runge-Kutta method. The angular velocity of each of the components $\xi_{1L}$ and $\xi_{1R}$ of the first oscillator $\xi_1$ represents a virtual rhythm which assists the motion of the left leg and the right leg, respectively. Further, the first oscillator $\xi_1$ has a feature to vary or oscillate periodically with an autonomous angular velocity or rhythm defined on the basis of the first intrinsic angular velocity $\omega_1$ while harmonizing with the rhythm of the first motion oscillator $\phi_1$ varying at an angular velocity or rhythm substantially the same as a rhythm of the actual walking motion, according to the "mutual entrainment" (harmonization effect) which is one of the properties of the Van del Pol equation.

In addition, the first model may be expressed by the Van der Pol equation having a different expression from that of the equation (10), or by a certain equation which generates the output oscillation signal varying periodically at the angular velocity defined on the basis of the first intrinsic angular velocity $\omega_1$, accompanied by the mutual entrainment to the input oscillation signal. Moreover, it is acceptable to increase the numbers of the first motion oscillator $\phi_1$, namely the determination object. The more numbers of the first motion oscillators $\phi_1$ are input to the first model, the motion will be more elaborately assisted by considering the motions of various body parts of the human P through the adjustment of the correlation coefficients, although the correlation members in a non-linear differential equation corresponding to the first oscillator $\xi_1$ generated by the Van der Pol equation for defining the first model will become more accordingly.

The phase difference between the periodical motion of the human P and the periodical operation of the motion assisting device 10 defines the motion behavior of the human P with respect to the operation of the motion assisting device 10. For example, when the phase difference is positive, the human P can move in a way of leading the motion assisting device 10. On the other hand, when the phase difference is negative, the human P can move in a way of being led by the motion assisting device 10. Therefore, when the phase difference (the first phase difference) $\delta\theta_1$ of the first oscillator $\xi_1$ with respect to the first motion oscillator $\phi_1$ deviates from the desired phase difference $\delta\theta_0$, it is very possible for the motion behavior of the human P to become unstable. Consequently, there is a high probability that the motion rhythm of the human P whose relative motions between the waist and the thigh assisted by the torque T varying periodically at an angular velocity corresponding to the auxiliary oscillator $\eta$ would deviate from the desired motion rhythm.

Therefore, from the viewpoint of matching the motion rhythm of the human P with the desired motion rhythm while maintaining the mutual harmony between the first motion oscillator $\phi_1$ and the first oscillator $\xi_1$, an appropriate second intrinsic angular velocity $\omega_2$ for defining the second oscillator $\xi_2$ is set by the intrinsic angular velocity setting element 130. In other words, an appropriate second intrinsic angular velocity $\omega_2$ is set from the viewpoint of realizing an appropriate phase difference between an assisting rhythm of the motion assisting device 10 and the motion rhythm of the human P so that the motion rhythm of the human P is in accordance with the desired motion rhythm while harmonizing the assisting rhythm of the motion assisting device 10 with the motion rhythm of the human P.

Specifically, the first phase difference setting element 131 sets a phase difference between the first motion oscillator $\phi_1$ and the first oscillator $\xi_1$ as the first phase difference $\delta\theta_1$ (FIG. 3/S031). The first phase difference $\delta\theta_1$ is calculated or set on the basis of a difference of time between, for example, a timing where $\phi_1=0$ and $(d\phi_1/dt)>0$ and a timing where $\xi_1=0$ and $(d\xi_1/dt)>0$.

Thereafter, the second phase difference setting element 132 sets the second phase difference $\delta\theta_2$ on a condition that the first phase difference $\delta\theta_1$ over the recent three walking cycles is constant or the variation of the first phase difference $\delta\theta_1$ is within an allowable range (FIG. 3/S032). In detail, a phase difference between the first virtual oscillator $\phi_1$ ($\phi_{1L}$, $\phi_{1R}$) and the second virtual oscillator $\phi_2$ ($\phi_{2L}$, $\phi_{2R}$) which are defined in the virtual model, which is expressed by the equations (21) and (22), is set as the second phase difference $\delta\theta_2$ according to the equation (23). The first virtual oscillator $\phi_1$ in the virtual model virtually represents the first motion oscillator $\phi_1$; the second virtual oscillator $\phi_2$ in the virtual model represents the auxiliary oscillator $\eta$ virtually.

$$d\phi_{1L}/dt=\omega_{1L}+\epsilon_L\sin(\phi_{2L}-\phi_{1L}), d\phi_{1R}/dt=\omega_{1R}+\epsilon_R\sin(\phi_{2R}-\phi_{1R}) \quad (21)$$

$$d\phi_{2L}/dt=\omega_{2L}+\epsilon_L\sin(\phi_{1L}-\phi_{2L}), d\phi_{2R}/dt=\omega_{2R}+\epsilon_R\sin(\phi_{1R}-\phi_{2R}) \quad (22)$$

$$\delta\theta_{2L}=\arcsin\{(\omega_{1/L}-\omega_{2/L})/2\epsilon_L\}, \delta\theta_{2R}=\arcsin\{(\omega_{1/R}-\omega_{2/R})/2\epsilon_R\} \quad (23)$$

Wherein, each component of "$\epsilon=(\epsilon_L, \epsilon_R)$" stands for a correlation coefficient representing the correlation between each component of the first virtual oscillator $\phi_1$ and each component of the second virtual oscillator $\phi_2$. "$\omega_1/=(\omega_{1/L}, \omega_{1/R})$" is the angular velocity for each component of the first virtual oscillator $\phi_1$, and "$\omega_2/=(\omega_{2/L}, \omega_{2/R})$" is the angular velocity for each component of the second virtual oscillator $\phi_2$.

Subsequently, the correlation coefficient setting element 133 sets the correlation coefficient $\epsilon$ so that the deviation between the first phase difference $\delta\theta_1$ set by the first phase difference setting element 131 and the second phase difference 602 set by the second phase difference setting element 132 is minimum (FIG. 3/S033).

Specifically, the correlation coefficient $\epsilon(t_i)$ at each timing $t_k$ where the first motion oscillator $\phi_1$ for each of the left and right components becomes zero is sequentially set according to the equation (24).

$$\epsilon_L(t_{k+1})=\epsilon_L(t_k)-B_L\{V_{1L}(t_{k+1})-V_{1L}(t_k)\}/\{\epsilon_L(t_k)-\epsilon_L(t_{k-1})\}$$

$$\epsilon_R(t_{k+1})=\epsilon_R(t_k)-B_R\{V_{1R}(t_{k+1})-V_{1R}(t_k)\}/\{\epsilon_R(t_k)-\epsilon_R(t_{k-1})\},$$

$$V_{1L}(t_{k+1})\equiv(1/2)\{\delta\theta_{1L}(t_{k+1})-\delta\theta_{2L}(t_k)\}^2,$$

$$V_{1R}(t_{k+1})\equiv(1/2)\{\delta\theta_{1R}(t_{k+1})-\delta\theta_{2R}(t_k)\}^2 \quad (24)$$

Wherein, each component of "$B=(B_L, B_R)$" is a coefficient representing the stability of the potential $V_1=(V_{1L}, V_{1R})$ for approximating each component of the first phase difference $\delta\theta_1$ to each of the left and right components of the second phase difference $\delta\theta_2$.

Next, the first angular velocity setting element 134 sets the angular velocity of the first virtual oscillator $\phi_1$ as the first angular velocity $\omega_1$/according to the equation (25) on the basis of the correlation coefficient $\epsilon$ set by the correlation coefficient setting element 133 so that the deviation between the first phase difference $\delta\theta 1$ and the second phase difference $\delta\theta_2$ for each component is minimum under the condition that the angular velocity $\omega_2$/of the second virtual oscillator $\phi_2$ is constant (FIG. 3/S034).

$$\omega_{1/L}(t_k)=-\alpha_L\int dt q_{1L}(t), \omega_{1/R}(t_k)=-\alpha_R\int dt q_{1R}(t)$$

$$q_{1L}(t)=(4\epsilon_L^2(t_k)-(\omega_{1L}(t)-\omega_{2L}(t_k)))^{1/2}\times\sin(\arcsin[(\omega_{1/L}(t)-\omega_{2/L}(t_{k-1}))/2\epsilon_L(t_k)]-\delta\theta_{2L}(t_k)),$$

$$q_{1R}(t)=(4\epsilon_L^2(t_k)-(\omega_{1/R}(t)-\omega_{2/R}(t_k)))^{1/2}\times\sin(\arcsin[(\omega_{1/R}(t)-\omega_{2/R}(t_{k-1}))/2\epsilon_R(t_k)]-\delta\theta_{2R}(t_k))) \quad (25)$$

Wherein, each component of "$\alpha=(\alpha_L, \alpha_R)$" is a coefficient representing the stability of the system.

The virtual model is constructed on a condition that the mutual harmony between the first motion oscillator $\phi_1$ and the first oscillator $\xi_1$ is also maintained between the first virtual oscillator $\phi_1$ and the second virtual oscillator $\phi_2$ by setting the correlation coefficient $\epsilon$ and the angular velocity $\omega_1$/. In other words, the virtual model is constructed so that the first virtual oscillator $\phi_1$ representing the periodical motion of the human P and the second virtual oscillator $\phi_2$ representing the periodical operation of the motion assisting device 10 vary periodically at the second phase difference $\delta\theta_2$ with a mutual harmonization.

Thereafter, the second angular velocity setting element 135 set the angular velocity of the second virtual oscillator $\phi_2$ as the second angular velocity $\omega_2$/for each component on the basis of the first angular velocity $\omega_1$/set by the first angular velocity setting element 134 (FIG. 3/S035). The second angular velocity $\omega_2/=(\omega_{2/L}, \omega_{2/R})$ is set according to the equation (26) so that the second phase difference $\delta\theta_2$ for each of the left and right components approximates to the desired phase difference $\delta\theta_0$. Subsequently, the second angular velocity $\omega_2$/is set as the second intrinsic angular velocity $\omega_2$ (FIG. 3/S036).

$$\omega_{2/L}(t_k)=\beta_L\int dt q_{2L}(t), \omega_{2/R}(t_k)=\beta_R\int dt q_{2R}(t)$$

$$q_{2L}(t)=(4\epsilon_L^2(t_k)-(\omega_{1/L}(t)-\omega_{2/L}(t_k)))^{1/2}\times\sin(\arcsin[(\omega_{1/L}(t_k)-\omega_{2/L}(t))/2\epsilon_L(t_k)]-\delta\theta_0),$$

$$q_{2R}(t)=(4\epsilon_R^2(t_k)-(\omega_{1/R}(t)-\omega_{2/R}(t_k)))^{1/2}\times\sin(\arcsin[(\omega_{1/R}(t_k)-\omega_{2/R}(t))/2\epsilon_R(t_k)]-\delta\theta_0) \quad (26)$$

Wherein, each component of "$\beta=(\beta_L, \beta_R)$" is a coefficient representing the stability of the system.

Accordingly, the second angular velocity $\omega_2$/is appropriately set from the viewpoint of approximating the phase difference between the periodical motion of the human P represented by the first virtual oscillator $\phi_1$ and the periodical operation of the motion assisting device 10 represented by the second virtual oscillator $\phi_2$ to the desired phase difference $\delta\theta_0$, while the mutual harmony between the first motion oscillator $\phi_1$ and the first oscillator $\xi_1$ is maintained between the periodical motion of the human P and the periodical operation of the motion assisting device 10.

The second oscillator generation element 140 corrects the second model by appropriately correcting a coefficient c contained in the simultaneous differential equation representing the second model according to the equation (28) (FIG. 3/S004). "$c=\{c_i|i=L+, L-, R+, R-\}$" is a coefficient to be adjusted so that the motion variable $\zeta$ determined by the motion variable determination element 108 approximates to a desired value $\zeta_0$ or a deviation therebetween is minimum. The coefficient $c_i$ is served as the "auxiliary coefficient" and is to be corrected accordingly whether or not each leg is in the reinforcement duration, which will be explained hereinafter.

$$c_i(t_{k+1})=c_i(t_k)-C_i\{V_i(t_{k+1})-V_i(t_k)\}/\{c_i(t_k)-c_i(t_{k-1})\},$$

$$V_i(t_{k+1})\equiv(1/2)\{\zeta_i(t_{k+1})-\zeta_i(t_k)\}^2 \quad (28)$$

Each component of "$c=c_{L+}, c_{L-}, c_{R+}, c_{R-}$" is a coefficient representing the stability of a potential $V_2=(V_{2L+}, V_{2L-}, V_{2R+}, V_{2R-})$ for approximating each component of the determination values of the motion variable $\zeta$ to each component of the desired value $\zeta_0$ thereof. "$\zeta_0=\{\zeta_{0i}|i=L+, L-, R+, R-\}$" stands for the desired value for each of the left hip joint angle and the right hip joint angle at the finished timing of the flexion motion and at the finished timing of the stretch motion of the thigh every walking cycle, respectively. The desired value $\zeta_0$ may be calculated on the basis of a desired footstep of the human P which is stored preliminarily in the memory, according to the correlation between the left hip joint angle and the right hip joint angle at the finished timing of the flexion motion and at the finished timing of the stretch motion of the thigh every walking cycle, respectively, and a footstep between the left and right feet, which is also stored in the memory.

Thereafter, the first processing element 101 determines whether each leg of the human P is at the on-ground state or at the off-ground state, and determines a posture of each leg with respect to the body (FIG. 3/S006).

The on-ground state and the off-ground state of each leg vary periodically when the human P performs the periodical walking motion. Thereby, whether each leg is at the on-ground state or at the off-ground state can be determined on the basis of an arbitrary variable which varies periodically according to the periodical walking motion of the human P. For example, whether each leg is at the on-ground state or at the off-ground state can be determined on the basis of a periodical variation pattern of an angle or angular velocity of each of the left and right hip joints, an acceleration of each leg in the vertical direction, a floor reaction force subjected to each leg of the human P or the like determined by an appropriate sensor. As a posture of each leg with respect to the body, a value of a variable which can be used to specify the phase of the hip joint angle or the like in the walking cycle (for example, the phase is zero at the time when a flexion motion is finished, the phase at the time when a subsequent stretch motion to the flexion motion is finished is $\pi$, and the phase at the time when another flexion motion after the subsequent stretch motion is finished is $2\pi$) is determined on the basis of the output signal from the hip joint angle sensor 11. The value of a state variable (to be described hereinafter) $u_i(i=L+, L-, R+, R-\}$ for defining the second model varies periodically according to the periodical walking motion of the human P, therefore, whether each leg is at the on-ground state or at the off-ground state, or the posture of each leg with respect to the body can be determined on the basis of a periodical variation pattern of the value of the state variable $u_i$.

Thereafter, the second processing element 102, on the basis of the determination result by the first processing element 101, adjusts the value of the auxiliary coefficient in such a way that the auxiliary coefficient in the reinforcement duration is greater than the auxiliary coefficient in the duration other than the reinforcement duration for each leg (FIG. 3/S008). The "reinforcement duration" is referred to as a duration including a second reinforcement duration, or a duration including a first reinforcement duration and a second reinforcement duration. The "first reinforcement duration" is referred to as a part or a total of the duration in which the leg is moved from the flexion motion at the off-ground state to the stretch motion to step on the ground. The "second reinforcement duration" is referred to as a part or a total of the duration in which the leg is performing a stretch motion at the on-ground state. The first reinforcement duration and the second reinforcement duration may be alternatively continuous or discontinuous in each walking cycle. Each of the first reinforcement duration and the second reinforcement duration may be continuous or discontinuous in each walking cycle, respectively. The coefficient $c_i$ is adjusted as the auxiliary coefficient. The coefficient $c_i$ is used to specify the variation feature of the state variable $u_i$ for defining the second model. The coefficient $c_i$ also serves as the correction subject adjusted on the basis of the motion variable $\zeta$. In addition to or in place of the coefficient $c_i$, it is also acceptable to adjust an inverse $\tau_{1i}^{-1}$ of the time constant as the auxiliary coefficient.

For example, when the left leg is in a normal duration other than the reinforcement duration, the left flexion coefficient $c_{L+}$ and the left stretch coefficient $c_{L-}$ are maintained at their former values. On the other hand, when the left leg is in the reinforcement duration, the left flexion coefficient $c_{L+}$ is maintained at its former value, while the left stretch coefficient $c_{L-}$ is increased as $(1+\delta)$ ($\delta>0$) times as its former value. The right leg is adjusted with the same auxiliary coefficient as the left leg. Specifically, when the right leg is in the normal duration other than the reinforcement duration, the right flexion coefficient $c_{R+}$ and the right stretch coefficient $c_{R-}$ are maintained at their former values. On the other hand, when the right leg is in the reinforcement duration, the right flexion coefficient $c_{R+}$ is maintained at its former value, while the right stretch coefficient $c_{R-}$ is increased as $(1+\delta)$ ($\delta>0$) times as its former value. Note that there is no limitation on the increment of the auxiliary coefficient for the left leg and the right leg.

Subsequently, the second oscillator generation element 140 generates the second oscillator $\xi_2=(\xi_{2L+}, \xi_{2L-}, \xi_{2R+}, \xi_{2R-})$ as an output oscillation signal from the second model, by inputting the second motion oscillator $\phi_2$ determined by the motion oscillator determination element 110 to the second model as an input oscillation signal (FIG. 3/S040). The second model represents the correlation between a plurality of second elements such as the neural elements or the like responsible for moving each leg to the flexion direction (forward direction) and the stretch direction (backward direction), and generates the output oscillation signal varying at an angular velocity defined according to the second intrinsic angular velocity $\omega_2$ set by the intrinsic angular velocity setting element 130 on the basis of the input oscillation signal as aforementioned.

The second model is defined by the simultaneous differential equation expressed by, for example, the equations (30). The simultaneous differential equation contains therein the state variable $u=\{u_i|i=L+, L-, R+, R-\}$ representing the behavior state (specified by an amplitude and a phase) of each thigh to the flexion direction (forward direction) and the stretch direction (backward direction), respectively, and a self-inhibition factor $v=\{v_i|i=L+, L-, R+, R-\}$ representing compliance of each behavior state. Moreover, the simultaneous differential equation contains therein the desired value $\zeta_0$ for each of the left hip joint angle and the right hip joint angle at the finished timing of the flexion motion and at the finished timing of the stretch motion of the thigh every walking cycle, respectively, and the coefficient $c_i$ to be corrected as mentioned above. It is acceptable to increase the numbers of the second motion oscillator $\phi_2$ which is served as the determination object. The more numbers of the second motion oscillators $\phi_2$ are input to the second model, the more the correlation members in the simultaneous differential equation will become, however, it may allow an appropriate assist in the periodical motion of the human P through the adjustment of the correlation coefficients by considering the correlation between motion states of various body parts of the human P.

$$\tau_{1L+}(du_{L+}/dt)=c_{L+}\zeta_{0L+}-u_{L+}+w_{L+/L-}\xi_{2L-}+w_{L+/R+}\xi_{2R+}-\lambda_L v_{L+}+f_1(\omega_{2L})+f_2(\omega_{2L})K_2\phi_{2L},$$

$$\tau_{1L-}(du_{L-}/dt)=c_{L-}\zeta_{0L-}-u_{L-}+w_{L-/L+}\xi_{2L+}+w_{L-/R-}\xi_{2R-}-\lambda_L v_{L-}+f_1(\omega_{2L})+f_2(\omega_{2L})K_2\phi_{2L},$$

$$\tau_1 R+(du_{R+}/dt)=c_{R+}\zeta_{0R+}-u_{R+}+w_{R+/L+}\xi_{2L+}+w_{R+/R-}\xi_{2R+}-\lambda_R v_{R+}+f_1(\omega_{2R})+f_2(\omega_{2R})K_2\phi_{2R},$$

$$\tau_{1R-}(du_{R-}/dt)=c_{R-}\zeta_{0R-}-u_{R-}+w_{R-/L+}\xi_{2L-}+w_{R-/R+}\xi_{2R+}-\lambda_R v_{L+}+f_1(\omega_{2R})+f_2(\omega_{2R})K_2\phi_{2R},$$

$$\tau_{2i}(dv_i/dt)=-v_i+\xi_{2i},$$

$$\xi_{2i}=H(u_i-u_{th})=0(u_i<u_{thi}) \text{ or } u_i(u_i \geq u_{thi}), \text{ or}$$

$$\xi_{2i}=fs(u_i)=u_i/(1+\exp(-u_i/D)) \quad (30)$$

"$\tau_{1i}$" is a time constant for defining the variation feature of the state variable $u_i$, and is expressed by a $\omega$-dependant coefficient $t_{(\omega)}$ and a constant $\gamma=(\gamma_L, \gamma_R)$ according to the equation (31). The time constant $\tau_{1i}$ varies in dependence on the second intrinsic angular velocity $\omega_2$. As aforementioned, "$\tau_{1i}$" may be also used as the auxiliary coefficient corrected by the second processing element 102.

$$\tau_{1i}=(t(\omega_{2L})/\omega_{2L})-\gamma_L(i=L+,L-),(t(\omega_{2R})/\omega_{2R})-\gamma_R(i=R+, R-) \quad (31)$$

"$\tau_{2i}$" is a time constant for defining the variation feature of the self-inhibition factor $v_i$. "$w_{i/j}$" is a negative second correlation coefficient for representing the correlation between the state variables $u_i$ and $u_j$ which represent the motions of the left and right legs of the human P toward the flexion direction and the stretch direction as the correlation of each component of the second oscillator $\xi_2$ (correlation between the output oscillation signals of the plurality of second elements). "$\lambda_L$" and "$\lambda_R$" are compliant coefficients. "$\kappa_2$" is a feedback coefficient in relation to the second motion oscillator $\phi_2$.

"$f_1$" is a first order function of the second intrinsic angular velocity $\omega_2$ defined by the equation (32) with a positive coefficient c. "$f_2$" is a second order function of the second intrinsic angular velocity $\omega_2$ defined by the equation (33) with coefficients $c_0$, $c_1$ and $c_2$.

$$f_1(\omega)=c\omega \quad (32)$$

$$f_2(\omega)=c_0+c_1\omega+c_2\omega^2 \quad (33)$$

The second oscillator $\xi_{2i}$ is equal to zero when the value of the state variable $u_i$ is smaller than a threshold value $u_{th}$; and is equal to the value of $u_i$ when the value of the state variable $u_i$ is equal to or greater than the threshold value $u_{th}$. In other words, the second oscillator $\xi_{2i}$ is defined by a sigmoid function fs (refer to the equations (30)). According thereto, if the state variable $u_{L+}$ representing the behavior of the left thigh toward the forward direction increases, the amplitude of the left flexion component $\xi_{2L+}$ of the second oscillator $\xi_2$ becomes greater than that of the left stretch component $\xi_{2L-}$ if the state variable $u_{R+}$ representing the behavior of the right thigh toward the forward direction increases, the amplitude of the right flexion component $\xi_{2R+}$ of the second oscillator $\xi_2$ becomes greater than that of the right stretch component $\xi_{2R-}$. Further, if the state variable $u_{L-}$ representing the behavior of the left thigh toward the backward direction increases, the amplitude of the left stretch component $\xi_{2L-}$ of the second oscillator $\xi_2$ becomes greater than that of the left flexion component $\xi_{2L+}$; if the state variable $u_{R-}$ representing the behavior of the right thigh toward the backward direction increases, the amplitude of the right stretch component $\xi_{2R-}$ of the second oscillator $\xi_2$ becomes greater than that of the right flexion component $\xi_{2R+}$. The motion toward the forward or backward direction of the leg (thigh) is recognized by, for example, the polarity of the hip joint angular velocity.

Next, the auxiliary oscillator generation element 150 sets the auxiliary oscillator $\eta=(\eta_L, \eta_R)$ on the basis of the second oscillator $\xi_2$ generated by the second oscillator generation element 140 (FIG. 3/S050). Specifically, the auxiliary oscillator q is generated according to the equation (40). In other words, the left component $\eta_L$ of the auxiliary oscillator $\eta$ is calculated as a sum of a product of the left flexion component $\xi_{2L+}$ of the second oscillator $\xi_2$ and the coefficient $\chi_{L+}$, and a product of the left stretch component $\xi_{2L-}$ of the second oscillator $\xi_2$ and the coefficient "$-\chi_{L-}$". The right component $\eta_R$ of the auxiliary oscillator $\eta$ is calculated as a sum of a product of the right flexion component $\xi_{2R+}$ of the second oscillator $\xi_2$ and the coefficient $\chi_{R+}$, and a product of the right stretch component $\xi_{2R-}$ of the second oscillator $\xi_2$ and the coefficient "$-\chi_{R-}$".

$$\eta_L = \chi_{L+}\xi_{2L+} - \chi_{L-}\xi_{2L-}, \eta_L = \chi_{R+}\xi_{2R+} - \chi_{R-}\xi_{2R-} \quad (40)$$

Thereafter, a current $I=(I_L, I_R)$ supplied to each of the left and right actuators 15 from the battery 1000 is adjusted by the first controller 100 on the basis of the auxiliary oscillator $\eta$. The current I is represented by, for example, $I(t)=G_1*\eta(t)$ (wherein, $G_1$ is a ratio coefficient) on the basis of the auxiliary oscillator $\eta$. Thereby, the assisting force to move each thigh (the second body part) with respect to the waist (the first body part), or the torque $T=(T_L, T_R)$ around the hip joint which is applied to the human P by the motion assisting device 10 through the first orthosis 1100 and the second orthosis 1200 is adjusted (FIG. 3/S060). The torque T is represented by, for example, $T(t)=G_2*I(t)$ (wherein, $G_2$ is a ratio coefficient) on the basis of the current I. Thereafter, the series of the aforementioned processes are performed repeatedly. Note that it is acceptable to control the motion of the motion assisting device 10 irrelative to the aforementioned control method on the condition that the thigh is appropriately moved with respect to the waist in a duration from the initiation of the walking motion of the human P to the finish of the walking motion after 2 to 3 foot steps.

Figure 5:
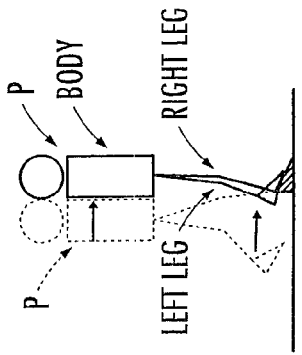
FIG. 5 is an explanatory diagram illustrating a walking motion of a human.
Figure 5:
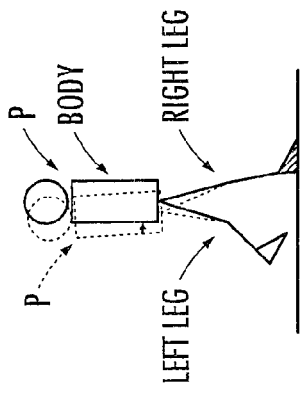
Figure 5:
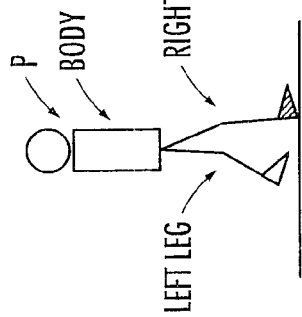
Figure 5:
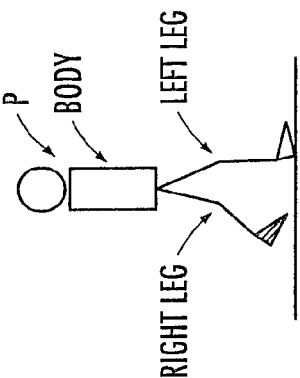
Figure 5:
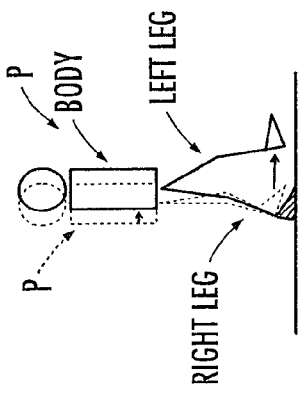

According to the motion assisting device 10 which exhibits the aforementioned functions as the first embodiment of the present invention, the second orthosis 1200 is actuated to move with respect to the first orthosis 1100 by the actuator 15, as illustrated in FIGS. 4(*a*) and 4(*b*). Thereby, the stretch motion and the flexion motion of the thigh with respect to the waist are assisted, and consequently, as illustrated in FIG. 5(*a*) to FIG. 5(*e*), the periodical walking motion of the human P by leaving each leg off the ground and stepping on the ground repeatedly can be assisted.

When the left leg is on the ground, the left stretch coefficient $c_{L-}$ is adjusted greater (refer to FIG. 3/S008), therefore, the left stretch component $u_{L-}$ of the state variable u representing the motion to the stretch direction (backward motion) of the left leg (left thigh) with respect to the body becomes greater, and the amplitude of the left stretch component $\xi_{2L-}$ of the second oscillator $\xi_2$ also becomes greater (refer to the equations 30). As a result thereof, the assisting force (torque) which assists the stretch motion of the left leg is reinforced according to amplitude of the left stretch component $\xi_{2L-}$ of the second oscillator $\xi_2$ (refer to the equation 40). In other words, the assisting force applied to the human P to assist the left leg (left thigh) in moving with respect to the body is reinforced only by an increment of the auxiliary coefficient increased in the reinforcement duration. Note that it is not limited that the reinforced assisting force is stronger than the assisting force in the duration other than the reinforcement duration. The same is applicable to the right leg.

The reinforcement duration includes the second reinforcement duration, namely, a part or a total of the second duration in which the leg is performing a stretch motion (backward motion) at the on-ground state. Accordingly, the stretch motion of the leg at the on-ground state is assisted by a relatively stronger assisting force, especially when the first reinforcement duration is contained in the reinforcement duration; and resultantly, the leg is subjected to a relatively stronger floor reaction force. The floor reaction force is transmitted to the body through the leg at the on-ground state to conduct the body to translate forward. When the leg is stretched by the assisting force at the on-ground state, there occurs a reflex (stretch reflex) to the stretch motion of the leg. As a result, the flexion motion of the leg at a subsequent off-ground state is induced by the stretch reflex at the previous off-ground state (refer to FIG. 5(*b*) to FIG. 5(*d*)). According thereto, the periodical walking motion of the human P can be assisted to conduct not only a stretch motion (backward motion) of the leg (thigh) of the human P at the on-ground state, but also a smooth flexion motion (forward motion) thereof at the off-ground state.

In addition, the scale and the rhythm of the periodical walking motion of the human P are assisted so as to match the desired motion scale and the desired motion rhythm thereof, respectively.

The motion of the human P can be assisted by the motion assisting device 10 so as to match the motion rhythm of the human P to the desired motion rhythm thereof according to the following method. In detail, the second intrinsic angular velocity $\omega_2$ is appropriately set from the viewpoint of approximating the phase difference between the periodical motion of the human P represented by the first virtual oscillator $\phi_1$ and the periodical operation of the motion assisting device 10 represented by the second virtual oscillator $\phi_2$ to the desired phase difference $\delta\theta_0$, while the mutual harmony between the first motion oscillator $\phi_1$ and the first oscillator $\xi_1$ is maintained between the periodical motion of the human P and the periodical operation of the motion assisting device 10 as mentioned above (refer to FIG. 3/S031 to S036). The second oscillator $\xi_2$ varies periodically at an angular velocity defined according to the second intrinsic angular velocity $\omega_2$ and the output torque T is controlled on the basis of the second oscillator $\xi_2$, therefore, the output torque T varies periodically at the same angular velocity defined according to the second intrinsic angular velocity $\omega_2$ (refer to FIG. 3/S040, S050 and S060). Accordingly, by applying the torque T to the human P, the motion rhythm of the human P and the operation rhythm of the motion assisting device 10 are harmonized; as a result thereof, the periodical walking motion of the human P is assisted so as to match the motion rhythm of the human P to the desired motion rhythm thereof.

The motion of the human P can be assisted by the motion assisting device 10 so as to match the motion scale of the human P to the desired motion scale thereof according to the following method. In detail, the second model is corrected so as to approximate the motion variable $\zeta$ (the left hip joint angle and the right hip joint angle at the finished timing of the flexion motion and at the finished timing of the stretch motion of the thigh every walking cycle, respectively) representing the motion scale of the periodical walking motion of the human P to the desired value $\zeta_0$ thereof (refer to FIG. 3/S004). Thereafter, the second oscillator $\xi_2$ is generated according to the corrected second model and the torque T applied to the human P is controlled on the basis of the generated second oscillator $\xi_2$ (refer to FIG. 3/S050 and S060). According thereto, in spite of the rhythm speed of the periodical motion of the human P, the periodical motion thereof can be assisted by applying an appropriate assisting force to the human P so as to match the motion scale (the footstep, the maximum hip joint angle or the like) of the human P to the desired motion scale thereof.

Figure 6:
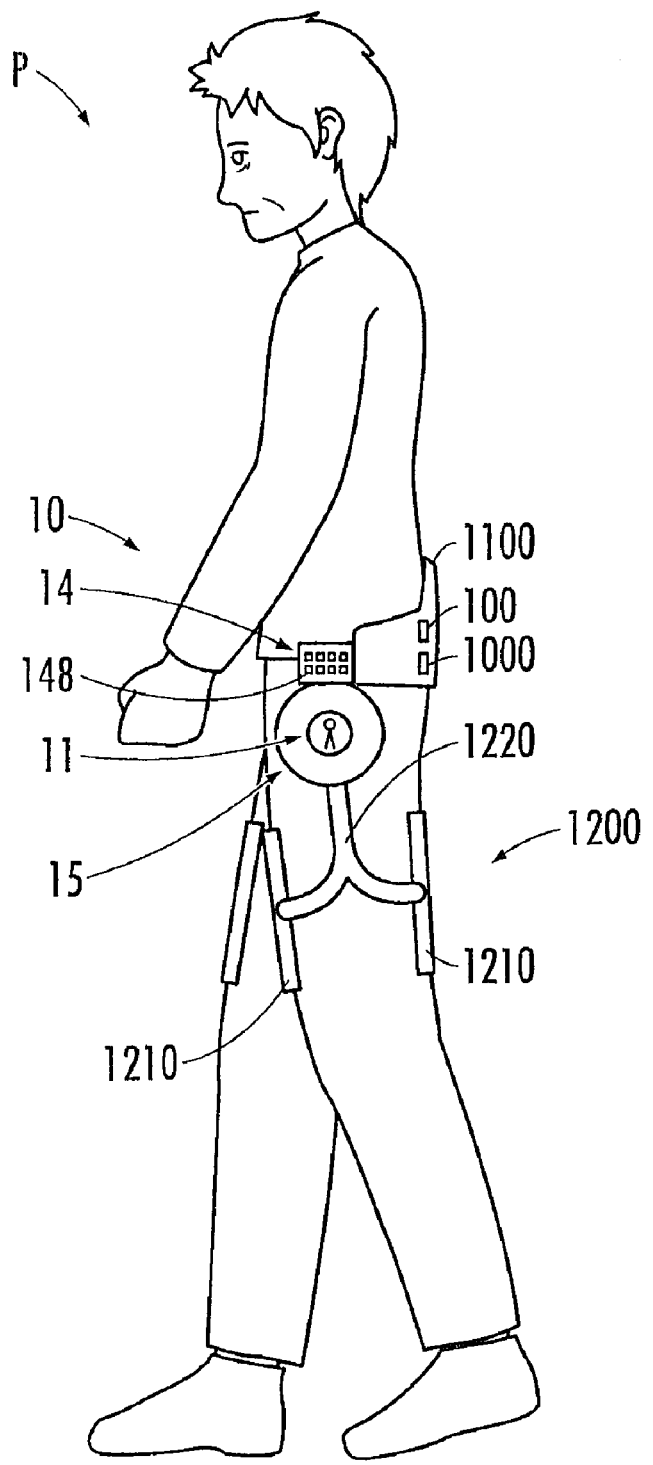
FIG. 6 is an explanatory diagram schematically illustrating a motion assisting device according to a second embodiment of the present invention.

Subsequently, descriptions will be carried out on a second embodiment of the present invention. The motion assisting device 10 of the second embodiment of the present invention illustrated in FIG. 6 has substantially the same configuration as the motion assisting device 10 of the first embodiment of the present invention illustrated in FIG. 1. Therefore, the same numerals are used to refer to identical parts and descriptions thereof are omitted. The motion assisting device 10 in the second embodiment of the present invention includes an adjusting device 14 having a plurality of adjusting buttons 148 configured to adjust a value of a time constant (to be described hereinafter) or the like. Note that it is acceptable to appropriately dispose the adjusting device 14 in the motion assisting device 10 so that it is convenient to be operated by the human P or a supervisor who supervises the walking training of the human P.

Figure 7:
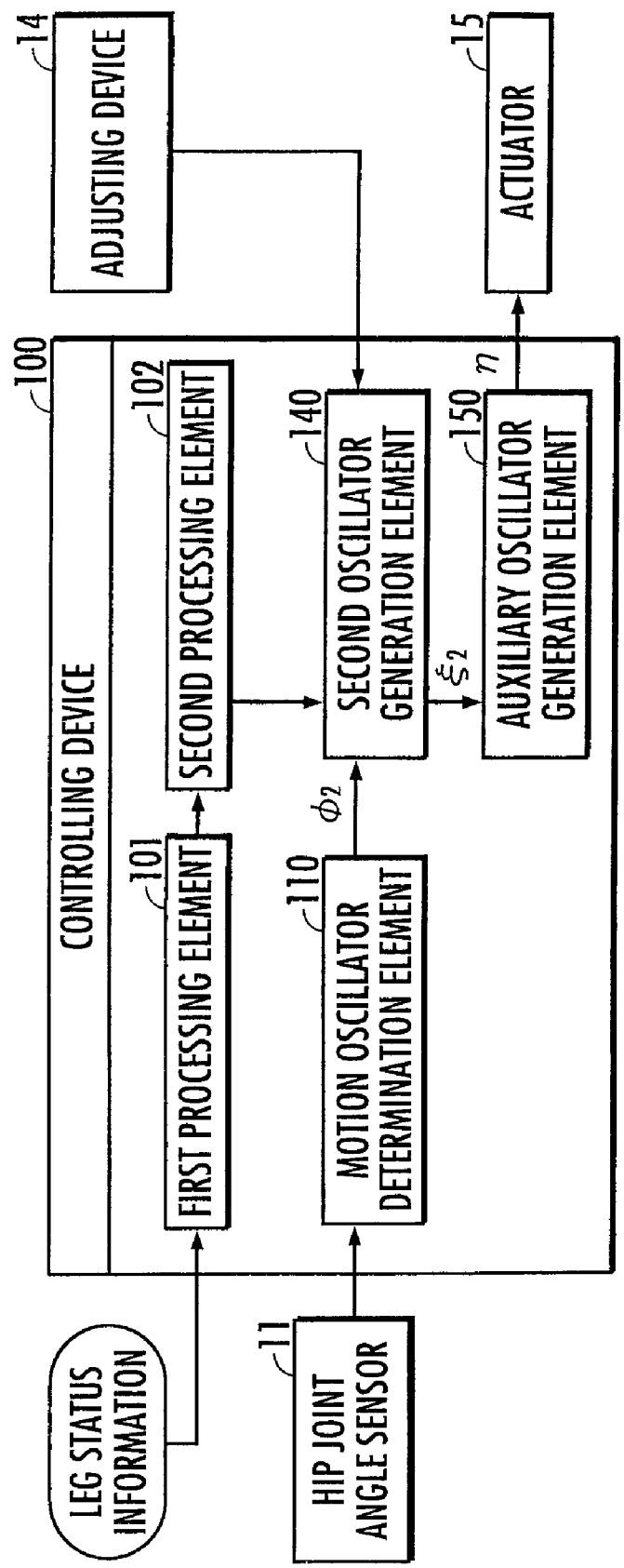
FIG. 7 is an explanatory diagram schematically illustrating a controlling device of the motion assisting device according to the second embodiment.

As illustrated in FIG. 7, the controlling device 100 in the second embodiment of the present invention is provided with a first processing element 101, a second processing element 102, a motion oscillator determination element 110, a second oscillator generation element 140, and an auxiliary oscillator generation element 150. In other words, the controlling device 100 in the second embodiment of the present invention is configured to omit the motion variable determination element 108, the first oscillator generation element 120 and the intrinsic angular velocity setting element 130 in the controlling device 100 in the first embodiment of the present invention. Each element may be constituted from a mutually different CPU, or a universal CPU or the like.

The motion oscillator determination element 110 determines each hip joint angle as the second motion oscillator $\phi_2$ on the basis of an output from the hip joint angle sensor 11. In the second embodiment, the first motion oscillator $\phi_1$ is not determined. The second oscillator generation element 140 generates the second oscillator $\xi_2$ as an output oscillation signal from the second model by inputting the second motion oscillator $\phi_2$ determined by the motion oscillator determination element 110 as an input oscillation signal to the second model. The second model in the second embodiment is the same as the second model in the first embodiment on a point that both of them are defined by the simultaneous differential equation (30). However, the second model in the second embodiment adjusts the coefficient $c=\{c_i|i=L+, L-, R+, R-\}$ of the desired value $\zeta_0=\{\zeta_{0i}|i=L+, L-, R+, R-\}$ of the motion variable representing a motion scale of the human P and the time constant $\tau_{1i}=\{\tau_{1i}|i=L+, L-, R+, R-\}$ through the adjusting buttons 148 of the adjusting device 14; while the second model in the first embodiment corrects the coefficient c on the basis of a deviation between a determination value of the motion variable $\zeta$ and the desired value $\zeta_0$. On this point, the second model in the second embodiment differs from the second model in the first embodiment (refer to the equation (28) and FIG. 3/S004). Moreover, the second intrinsic angular velocity $\omega_2$ contained in the second model of the second embodiment is adjusted indirectly through adjusting the time constant $\tau_{1i}$ (refer to the equation (31)); on this point, it differs from the second model of the first embodiment in which the second intrinsic angular velocity $\omega_2$ is set according to the virtual model. Similar to the first embodiment, the auxiliary oscillator generation element 150, on the basis of the second oscillator $\xi_2$ generated by the second oscillator generation element 140, generates the auxiliary oscillator $\eta$. The auxiliary oscillator $\eta$ is used to define a variation pattern of the torque applied to the thigh by the actuator 15 in the motion assisting device 10.

Hereinafter, the operation of the motion assisting device 10 having the configuration mentioned above in the second embodiment of the present invention will be described. The motion oscillator determination element 110 determines the left hip joint angle and the right hip joint angle of the human P as the second motion oscillator $\phi_2=(\phi_{2L}, \phi_{2R})$ on the basis of the output from the hip joint angle sensor 11 (FIG. 8/S110).

Figure 8:
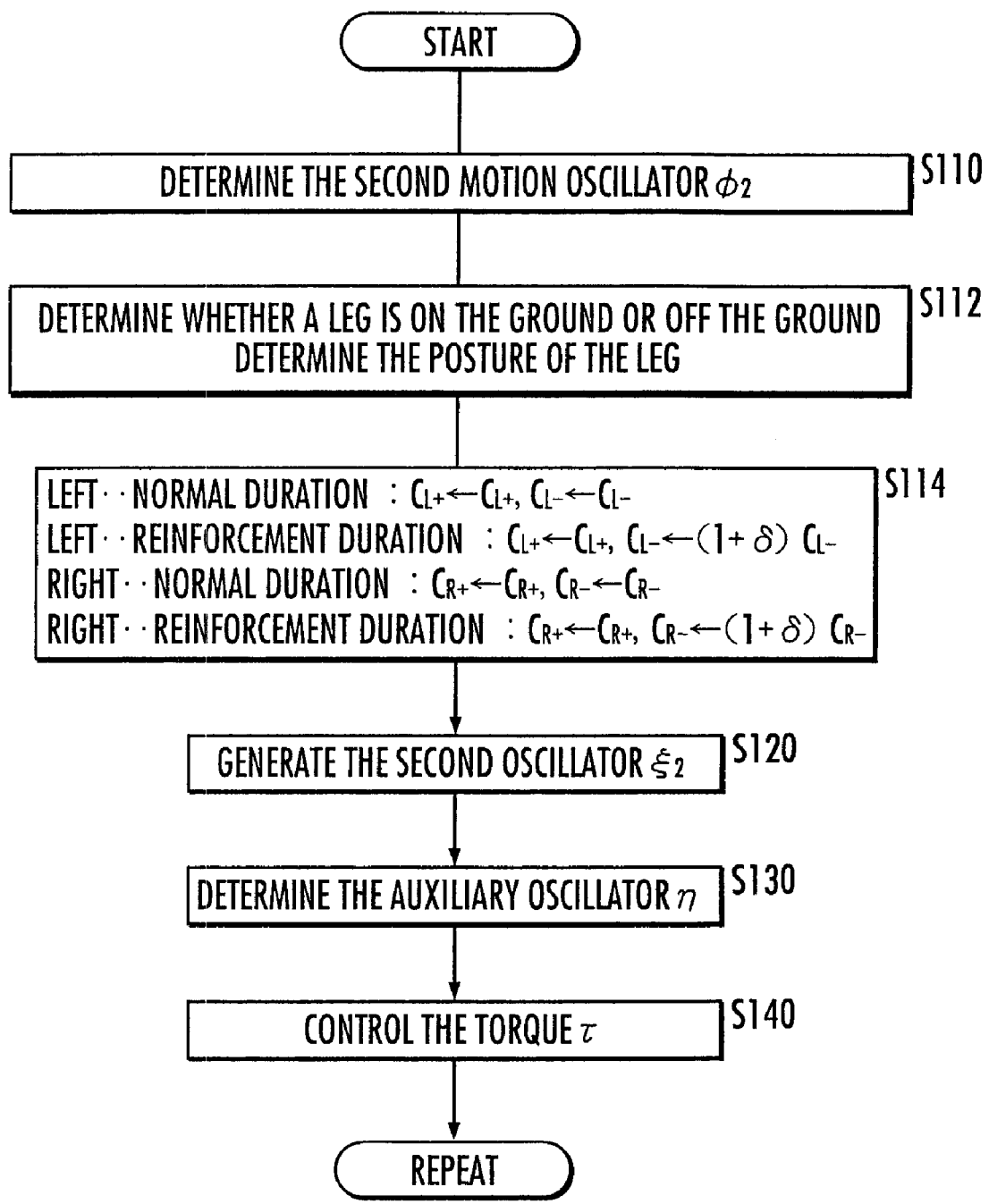
FIG. 8 is a flow chart illustrating a motion assist method according to the second embodiment.

Thereafter, similar to that in the first embodiment, the first processing element 101 determines whether each leg of the human P is at the on-ground state or at the off-ground state, and determines a posture of each leg with respect to the body (FIG. 8/S112). Further, similar to that in the first embodiment, the second processing element 102, on the basis of the determination result by the first processing element 101, adjusts the value of the auxiliary coefficient in such a way that the auxiliary coefficient in the reinforcement duration is greater than the auxiliary coefficient in the duration other than the reinforcement duration for each leg (FIG. 8/S114).

Subsequently, the second oscillator generation element 140 generates the second oscillator $\xi_2=\{\xi_{2i}|i=L+, L-, R+, R-\}$ as an output oscillation signal from the second model by inputting the second motion oscillator $\theta_2$ determined by the motion oscillator determination element 110 as an input signal to the second model (FIG. 8/S120). As aforementioned, the time constant $\tau_{1i}$ and the coefficient $c_i$ related to the desired value $\zeta_{0i}$ of the motion variable in the simultaneous differential equation (30) can be adjusted by operating the adjusting buttons 148 in the adjusting device 14. In addition to or in place of the time constant $\tau_{1i}$ or the coefficient $c_i$, the time constant $\tau_{2i}\{\tau_{2i}|i=L+, L-, R+, R-\}$, the correlation coefficient $w_{i/j}$ or the like may be adjusted through the adjusting device 14.

Next, similar to that in the first embodiment, the auxiliary oscillator $\eta=(\eta_L, \eta_R)$ is set by the auxiliary oscillator generation element 150 on the basis of the second oscillator $\xi_2$ (FIG. 8/S130). The torque $T=(T_L, T_R)$ applied to the human P from the motion assisting device 10 through the first orthosis 1100 and the second orthosis 1200 is adjusted (FIG. 8/S140). Thereafter, the series of the aforementioned processes are performed repeatedly. Note that it is acceptable to control the motion of the motion assisting device 10 irrelative to the aforementioned control method on the condition that the thigh is appropriately moved with respect to the waist in a duration from the initiation of the walking motion of the human P to the finish of the walking motion after 2 to 3 foot steps.

Similar to the motion assisting device 10 in the first embodiment of the present invention, according to the motion assisting device 10 which exhibits the aforementioned functions in the second embodiment of the present invention, the second orthosis 1200 is actuated to move with respect to the first orthosis 1100 by the actuator 15, as illustrated in FIGS. 4(a) and 4(b). Thereby, the stretch motion and the flexion motion of the thigh with respect to the waist are assisted, and consequently, as illustrated in FIG. 5(a) to FIG. 5(e), the periodical walking motion of the human P by leaving each leg off from the ground and stepping on the ground repeatedly can be assisted.

The assisting force applied to the human P to assist the leg (thigh) in moving with respect to the body is reinforced only by an increment of the auxiliary coefficient increased in the reinforcement duration. Note that it is not limited that the reinforced assisting force is stronger than the assisting force in the duration other than the reinforcement duration. The reinforcement duration includes the second reinforcement duration, namely, a part or a total of the second duration in which the leg is performing a stretch motion at the on-ground state. Accordingly, the stretch motion of the leg at the on-ground state is assisted by a relatively stronger assisting force, especially when the first reinforcement duration is contained in the reinforcement duration; and resultantly, the leg is subjected to a relatively stronger floor reaction force. The floor reaction force is transmitted to the body through the leg at the on-ground state to conduct the body to translate forward. When the leg is stretched by the assisting force at the on-ground state, there occurs a reflex (stretch reflex) to the stretch motion of the leg. As a result, the flexion motion of the leg at a subsequent off-ground state is induced by the stretch reflex at the previous off-ground state (refer to FIG. 5(b) to FIG. 5(d)). According thereto, the periodical walking motion of the human P can be assisted to conduct not only a stretch motion (backward motion) of the leg (thigh) of the human P at the on-ground state, but also a smooth flexion motion (forward motion) thereof at the off-ground state.

Since no other model but the second model is used, accordingly, the computation processing load needed to generate the second oscillator $\xi_2$ by the first controlling device 100 can be reduced. Further, the time constant $\tau_1 = \{\tau_{1i} | i = L+, L-, R+, R-\}$ and the coefficient $c = \{c_i | i = L+, L-, R+, R-\}$ contained in the simultaneous differential equation (refer to the equations (30)) for defining the second model are partially adjusted via the operations on the buttons 148 of the adjusting device 14. Thereafter, the second oscillator $\xi_2$ is generated according to the adjusted second model and the output torque T applied to the human P is controlled to vary periodically according to the second oscillator $\xi_2$ (refer to S130 and S140 in FIG. 8). Accordingly, the periodical motion of the human P can be assisted by applying the assisting force to the human P so as to make the motion scale and the motion rhythm of the periodical motion of the human P match the desired motion scale and the desired motion rhythm thereof, respectively, while reducing the computation processing load. Furthermore, the variation pattern of the second oscillator $\xi_2$ (angular velocity) and the variation pattern of the output torque T from the actuator 15 are adjusted by adjusting the time constant $\tau_{1i}$ representing the variation pattern of the state variable $u_i$. Thereby, the periodical motion of the human P assisted by the torque T is made to approximate the motion rhythm of the human P to the desired motion rhythm thereof. Additionally, the magnitude of the second oscillator $\xi_2$ and the magnitude of the output torque T from the actuator 15 can be adjusted by adjusting the coefficient $c_i$ related to the desired value $\zeta_0$ of the motion variable $\zeta$. Thereby, the periodical motion of the human P can be assisted so as to approximate the motion scale of the periodical motion to the desired motion scale thereof.

In the aforementioned embodiment, it is described that the walking motion of the human P is assisted. However, it is also possible to assist the walking motion of an animal other than a human, such as a monkey (and/or ape), a dog, a horse, cattle or the like.

In the first embodiment, the amplitude and the phase of the periodical operation of the motion assisting device 10 represented by the auxiliary oscillator r are controlled on the basis of the amplitude and the phase of the periodical walking motion of the human P represented by the first motion oscillator $\phi_1$ and the second motion oscillator $\phi_2$. In the second embodiment, the amplitude and the phase of the periodical operation of the motion assisting device 10 represented by the auxiliary oscillator $\eta$ are controlled on the basis of the amplitude and the phase of the periodical walking motion of the human P represented by the second motion oscillator $\phi_2$. Additionally, various algorithms can be used to control the operation of the motion assisting device 10 as long as they can apply the assisting force varying periodically so as to assist the thigh (or the leg) in moving periodically with respect to the body. For example, it is acceptable to adopt the generation method described in the first prior art or the second prior art as a generation method for the auxiliary oscillator $\eta$ on the basis of the second oscillator $\xi_2$.

In the second prior art, the first auxiliary oscillator representing a virtual elastic force which varies periodically is generated to approximate the motion variable $\zeta$ to the desired value $\zeta_0$ and the auxiliary oscillator is generated so as to contain the first auxiliary oscillator. A spring coefficient specifying the elastic force may be adjusted as the auxiliary coefficient.

In the above embodiment, the auxiliary coefficient is adjusted on the basis whether each leg of the human P is in the reinforcement duration by adjusting the coefficient $c_i$ (inverse $\tau_{1i}^{-1}$ of the time constant, in addition to or in place of the coefficient $c_i$) for specifying the behavior feature of the state variable $u_i$ for defining the second model. The magnitude of the assisted force is also adjusted according to the value of the auxiliary coefficient (refer to FIG. 3/S006 and S008, FIG. 8/S112 and S114). Additionally, the coefficient $\chi_{ai}$ used in generating the auxiliary oscillator $\eta$ may be adjusted as the auxiliary coefficient (refer to the equation (40)). For example, the coefficient $\chi_{L-}$ is adjusted in such a way that the coefficient $\chi_{L-}$ related to the left stretch component $\xi_{2L-}$ of the second oscillator $\xi_2$ is greater when the left leg is in the reinforcement duration than that when the left leg is in the normal duration. Accordingly, the assisting force to assist the left leg (left thigh) in the stretch motion is reinforced only by the increment on the auxiliary coefficient $\chi_{L-}$ in the reinforcement duration. Similarly, the coefficient $\chi_{R-}$ is adjusted in such a way that the coefficient $\chi_{R-}$ related to the right stretch component $\xi_{2R-}$ of the second oscillator $\xi_2$ when the right leg is in the reinforcement duration is greater than that when the right leg is in the normal duration. Accordingly, the assisting force to assist the right leg (right thigh) in the stretch motion is reinforced only by the increment on the auxiliary coefficient $\omega_{R-}$ in the reinforcement duration.

Figure 9:
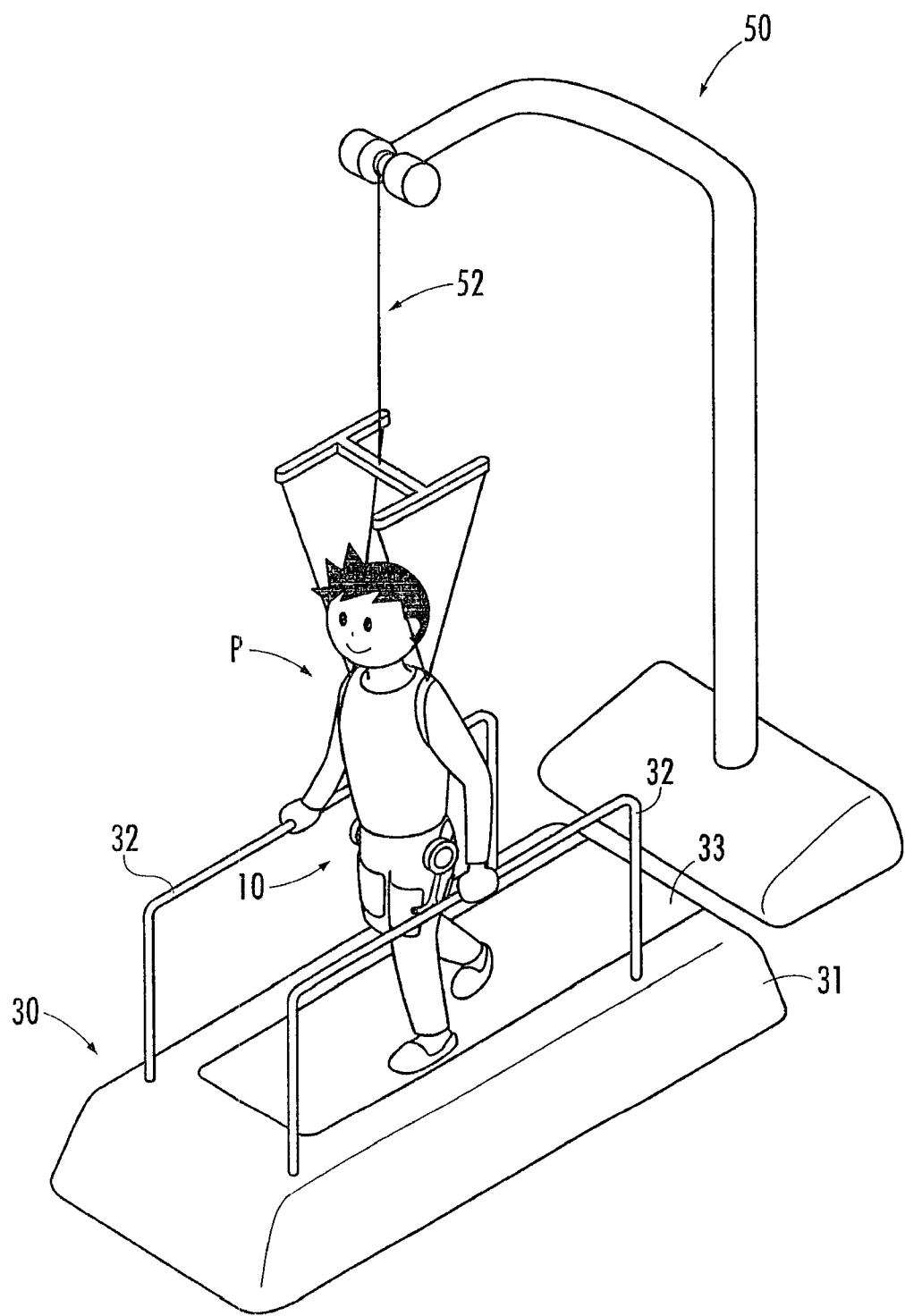
FIG. 9 is an explanatory diagram illustrating a walk training method (part 1)

The present invention is not merely limited to the motion assisting device 10 used in the walking training of the human P as illustrated in FIG. 9, it is also possible to include a treadmill 30 and a lifter 50 (load alleviation unit). The human P walks by advancing against the motion of an endless belt 33 moving backward, with a partial weight thereof supported by holding a handrail 32 (load alleviation unit) disposed at both sides of a base 31 of the treadmill 30 with both hands, respectively. The endless belt 33 is supported over a plurality of rollers and the speed of the endless belt 33 is controlled by controlling the rotating velocity of a part of the plurality of rollers. Additionally, a partial weight of the human P is supported by the lifter 50 through a wire 52 whose roll length is adjustable.

Figure 10:
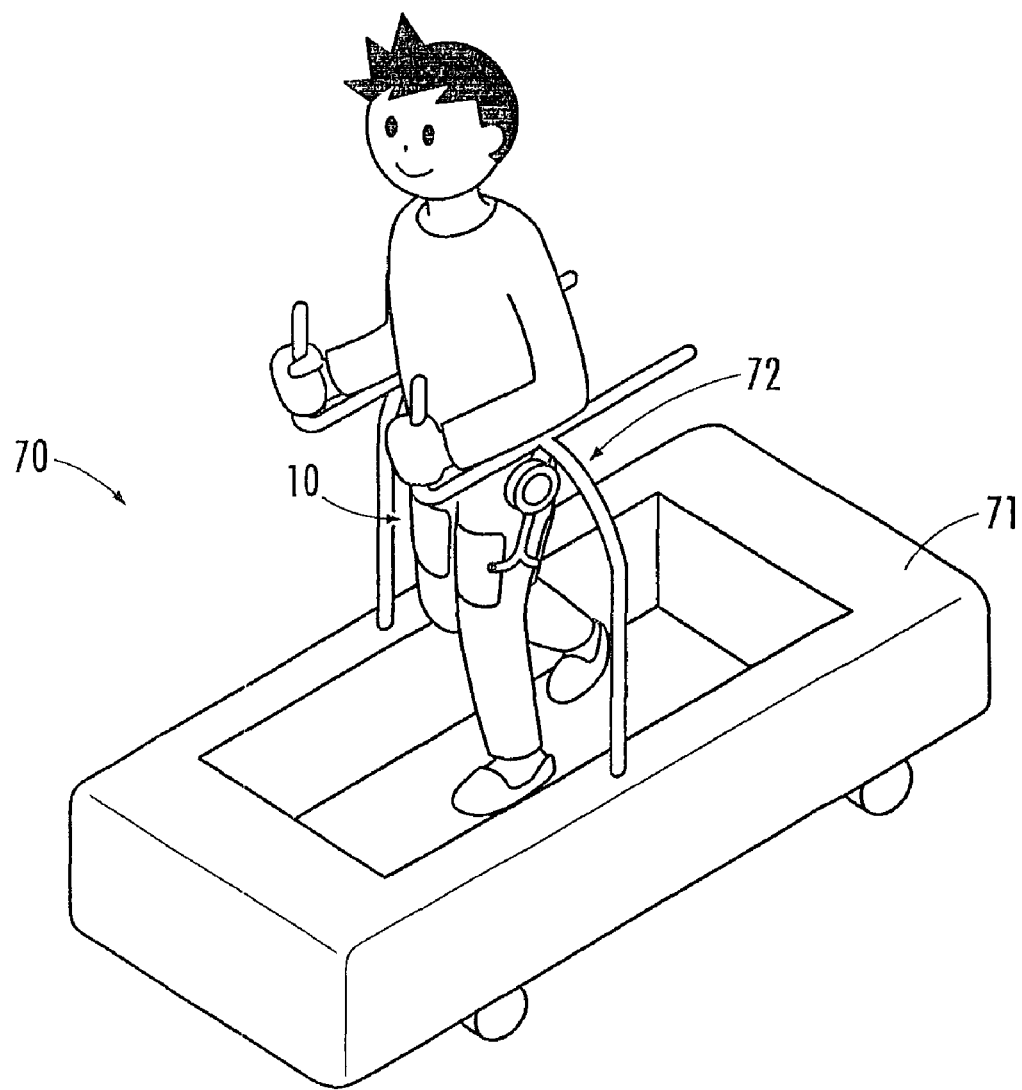
FIG. 10 is an explanatory diagram illustrating a walk training method (part 2).

Furthermore, a walking machine 70 as illustrated in FIG. 10 may be used in the walking training of the human P. A partial weight of the human P is supported by holding a handrail 72 (load alleviation unit) which is disposed at both sides of a base 71 of the walking machine 70 with both hands, respectively. The base 71 can move at a rotating velocity of wheels disposed at the bottom thereof controlled according to the walking motion of the human P.

What is claimed is:

1. A motion assisting device for assisting a walking motion of a creature by applying to the creature an assisting force which assists a leg of the creature in moving with respect to a body of the creature, comprising:
   a hip joint angle sensor configured to measure a hip joint angle of the creature; and
   a controlling device configured to control the assisting force so that the assisting force increases as a value of an auxiliary coefficient,
   wherein the controlling device includes:
   a first processing element configured to use the hip joint angle of the creature measured by the hip joint angle sensor or an acceleration of each leg of the creature in the vertical direction measured by an accelerator or a floor reaction force measured by a floor reaction force sensor subject to each leg of the creature to determine: whether the leg of the creature is at an on-ground state or at an off-ground state; and use the hip joint angle of the creature measured by the hip joint angle sensor to determine a posture of the leg of the creature with respect to the body of the creature;
   a second processing element configured to adjust the auxiliary coefficient so as to make the auxiliary coefficient greater during a reinforcement duration of the walking motion of the creature than during a duration other than the reinforcement duration of the walking motion of the creature, wherein the reinforcement duration contains at least part of a duration in which the leg is performing a stretch motion at the on-ground state, and a determination of whether the walking motion of the creature is in the reinforcement duration or the duration other than the reinforcement duration is made on the basis of the posture of the leg with respect to the body and whether the leg is at the on-ground state or the off-ground state, as determined by the first processing element;
   a motion oscillator determination element configured to determine a first motion oscillator which periodically varies according to the walking motion of the creature; and
   a first oscillator generation element configured to generate a first oscillator as an output oscillation signal from a first model by inputting the first motion oscillator determined by the motion oscillator determination element to the first model as an input oscillation signal, in which the first model is configured to generate an output oscillation signal which periodically varies at an angular velocity defined according to a first intrinsic angular velocity on the basis of an input oscillation signal; and the controlling device is configured to control the assisting force so that the assisting force periodically varies according to an amplitude defined according to the function including the auxiliary coefficient and an angular velocity of the first oscillator generated by the first oscillator generation element.

2. The motion assisting device according to claim 1, wherein
   the controlling device includes a motion variable determination element configured to determine a motion variable representing a scale of the walking motion performed by the creature;
   the first model is defined by a simultaneous differential equation having a plurality of state variables representing a behavior state of the creature; and
   the first oscillator generation element corrects the first model by correcting a constant or a coefficient contained in the simultaneous differential equation so as to approximate a determination value of the motion variable obtained from the motion variable determination element to a desired value and generates the first oscillator on the basis of the state variables obtained by solving the simultaneous differential equation.

3. The motion assisting device according to claim 2, wherein the constant or the coefficient in the simultaneous differential equation adjusted by the first processing element serves as the auxiliary coefficient.

4. The motion assisting device according to claim 1 further includes an adjusting device, wherein
   the first model is defined by a simultaneous differential equation having a plurality of state variables representing a behavior state of the creature;
   the adjusting device is configured to enable a user to adjust a constant or a coefficient in the simultaneous differential equation; and
   the first oscillator generation element generates the first oscillator on the basis of the state variables obtained by solving the simultaneous differential equation.

5. The motion assisting device according to claim 1, wherein
   the controlling device includes a motion variable determination element configured to determine a motion variable representing a scale of the walking motion performed by the creature; and
   the controlling device is configured to control the assisting force so that the assisting force periodically varies according to an amplitude determined according to an elastic coefficient of a virtual elastic element serving as the auxiliary coefficient and an angular velocity of the first oscillator generated by the first oscillator generation element, both of which are used to approximate a determination value of the motion variable obtained from the motion variable determination element to a desired value.

6. The motion assisting device according to claim 1, wherein
   the motion oscillator determination element is configured to determine a second motion oscillator which periodically varies according to the walking motion of the creature;
   the controlling device includes a second oscillator generation element and an intrinsic angular velocity setting element, in which
   the second oscillator generation element is configured to generate a second oscillator as an output oscillation signal from a second model by inputting the second motion oscillator determined by the motion oscillator determination element to the second model as an input oscillation signal, in which the second model is configured to generate an output oscillation signal which varies at an angular velocity defined according to a second intrinsic angular velocity by entraining to an input oscillation signal; and the intrinsic angular velocity setting element is configured to set an angular velocity of a first virtual oscillator as the first intrinsic angular velocity according to a virtual model on the basis of a second phase difference between the second motion oscillator determined by the motion oscillator determination element and the second oscillator generated by the second oscillator generation element so as to approximate a first phase difference to a desired phase difference, in which the virtual model is expressed by a second virtual oscillator and the first virtual oscillator which vary periodically with the first phase difference while interacting mutually.

7. The motion assisting device according to claim 1, further comprising:

an actuator configured to apply the assisting force to the creature, wherein the controlling device is configured to control the actuator to apply the assisting force.

8. A motion assisting device for assisting a walking motion of a creature by applying to the creature an assisting force which assists a leg of the creature in moving with respect to a body of the creature, comprising:

a hip joint angle sensor configured to measure a hip joint angle of the creature; and a controlling device configured to control the assisting force so that the assisting force increases as a value of an auxiliary coefficient increases, wherein the controlling device includes:

a first processing element configured to use the hip joint angle of the creature measured by the hip joint angle sensor or an acceleration of each leg of the creature in the vertical direction measured by an accelerator or a floor reaction force measured by a floor reaction force sensor subject to each leg of the creature to determine: whether the leg of the creature is at an on-ground state or at an off-ground state; and use the hip joint angle of the creature measured by the hip joint angle sensor to determine a posture of the leg of the creature with respect to the body of the creature; and a second processing element configured to adjust the auxiliary coefficient so as to make the auxiliary coefficient greater during a reinforcement duration of the walking motion of the creature than during a duration other than the reinforcement duration of the walking motion of the creature, wherein the reinforcement duration contains at least a part of a duration in which the leg of the creature is performing a stretch motion at the on-ground state, and a determination of whether the walking motion of the creature is in the reinforcement duration or the duration other than the reinforcement duration is made on the basis of the posture of the leg with respect to the body and whether the leg is at the on-ground state or the off-ground state, as determined by the first processing element.

9. The motion assisting device according to claim 8, wherein the reinforcement duration consists of at least part of the duration in which the leg is performing the stretch motion at the on-ground state.

10. The motion assisting device according to claim 9, further comprising:

an actuator configured to apply the assisting force to the creature, wherein the controlling device is configured to control the actuator to apply the assisting force.

11. The motion assisting device according to claim 8, further comprising:

an actuator configured to apply the assisting force to the creature, wherein the controlling device is configured to control the actuator to apply the assisting force.

12. A motion assisting device for assisting a walking motion of a creature by applying to the creature an assisting force which assists a leg of the creature in moving with respect to a body of the creature, comprising:

a hip joint angle sensor configured to measure a hip joint angle of the creature; and a controlling device configured to control the assisting force so that the assisting force increases as a value of an auxiliary coefficient, wherein the controlling device includes:

a first processing element configured to use the hip joint angle of the creature measured by the hip joint angle sensor or an acceleration of each leg of the creature in the vertical direction measured by an accelerator or a floor reaction force measured by a floor reaction force sensor subject to each leg of the creature to determine: whether the leg of the creature is at an on-ground state or at an off-ground state; and use the hip joint angle of the creature measured by the hip joint angle sensor to determine a posture of the leg of the creature with respect to the body of the creature; and a second processing element configured to adjust the auxiliary coefficient so as to make the auxiliary coefficient greater during a reinforcement duration of the walking motion of the creature than during a duration other than the reinforcement duration of the walking motion of the creature, wherein the reinforcement duration contains: a first reinforcement duration which includes at least a part of a first duration in which the leg is moved from a flexion motion to the stretch motion at the off-ground state to step on the ground and a second reinforcement duration which includes at least a part of a second duration in which the leg is performing a stretch motion at the on-ground state, and a determination of whether the walking motion of the creature is in the reinforcement duration or the duration other than the reinforcement duration is made on the basis of the posture of the leg with respect to the body and whether the leg is at the on-ground state or the off-ground state, as determined by the first processing element.

13. The motion assisting device according to claim 12, further comprising:

an actuator configured to apply the assisting force to the creature, wherein the controlling device is configured to control the actuator to apply the assisting force.

* * * * *